(12) United States Patent
Kawamura et al.

(10) Patent No.: US 10,155,880 B2
(45) Date of Patent: Dec. 18, 2018

(54) ORGANIC-RESIN-COATED METAL SHEET, PROCESS FOR PRODUCING SAME, METALLIC CAN OBTAINED BY PROCESSING SAID ORGANIC-RESIN-COATED METAL SHEET, AND CAN LID

(71) Applicant: TOYO SEIKAN GROUP HOLDINGS, LTD., Tokyo (JP)

(72) Inventors: Satoshi Kawamura, Yamaguchi (JP);
Tomonori Fukunaga, Yamaguchi (JP);
Shinichi Kasahara, Yamaguchi (JP);
Masayuki Uchida, Yamaguchi (JP);
Masashi Ikebuchi, Kanagawa (JP);
Yuji Funagi, Yokohama (JP); Keizou Kanzaki, Kanagawa (JP)

(73) Assignee: TOYO SEIKAN GROUP HOLDINGS CO., LTD., Tokyo (JP)

( * ) Notice: Subject to any disclaimer, the term of this patent is extended or adjusted under 35 U.S.C. 154(b) by 247 days.

(21) Appl. No.: 14/907,266

(22) PCT Filed: Jul. 18, 2014

(86) PCT No.: PCT/JP2014/069209
§ 371 (c)(1),
(2) Date: Jan. 22, 2016

(87) PCT Pub. No.: WO2015/012222
PCT Pub. Date: Jan. 29, 2015

(65) Prior Publication Data
US 2016/0145462 A1 May 26, 2016

(30) Foreign Application Priority Data
Jul. 22, 2013 (JP) ................................ 2013-151407

(51) Int. Cl.
*B32B 15/08* (2006.01)
*B32B 15/09* (2006.01)
(Continued)

(52) U.S. Cl.
CPC ........ *C09D 167/02* (2013.01); *B29C 47/0064* (2013.01); *B29C 47/025* (2013.01);
(Continued)

(58) Field of Classification Search
None
See application file for complete search history.

(56) References Cited

U.S. PATENT DOCUMENTS 5,384,354 A * 1/1995 Hasegawa ............... B29C 55/12
524/539
5,759,651 A * 6/1998 Machii ..................... B65D 1/28
220/62.22
(Continued)

FOREIGN PATENT DOCUMENTS

JP    H 07145252 A    6/1995
JP    H 07330924 A    12/1995
(Continued)

OTHER PUBLICATIONS

International Search Report, dated Oct. 21, 2014 for corresponding International Application No. PCT/JP2014/069209 with English translation.

*Primary Examiner* — Vivian Chen
(74) *Attorney, Agent, or Firm* — Intellectual Property Law Group LLP

(57) ABSTRACT

An object of the present invention is to provide an organic-resin-coated metal sheet for beverages and foods having retort blushing resistance and can manufacturability, a manufacturing method thereof, and a metal can and a can lid that are made by processing the organic-resin-coated metal
(Continued)

sheet. An organic-resin-coated metal sheet of the present invention is an organic-resin-coated metal sheet in which an unstretched film is stacked on at least a single surface of a metal sheet, and is characterized in that the unstretched film is composed of a polyester-based resin composition obtained by blending copolymerized polyester (I) composed mainly of a polyethylene terephthalate-based resin with crystalline polyester (II) composed mainly of a polybutylene terephthalate-based resin with a mixing amount of the crystalline polyester (II) of 20 to 45 wt %.

12 Claims, 5 Drawing Sheets

(51) Int. Cl.
| | |
|---|---|
| B32B 27/36 | (2006.01) |
| B32B 37/15 | (2006.01) |
| C08L 67/00 | (2006.01) |
| C08L 67/02 | (2006.01) |
| C08L 67/03 | (2006.01) |
| C09D 167/00 | (2006.01) |
| C09D 167/02 | (2006.01) |
| C09D 167/03 | (2006.01) |
| B29C 47/00 | (2006.01) |
| B29C 47/02 | (2006.01) |
| B29C 47/92 | (2006.01) |
| B65D 1/12 | (2006.01) |

(52) U.S. Cl.
CPC .............. *B29C 47/92* (2013.01); *B65D 1/12* (2013.01); *C08L 67/02* (2013.01); *B29C 2947/926* (2013.01); *B29C 2947/92561* (2013.01); *B29C 2947/92704* (2013.01); *B32B 15/08* (2013.01); *B32B 15/09* (2013.01); *B32B 27/36* (2013.01); *B32B 37/15* (2013.01); *B32B 37/153* (2013.01); *B32B 2250/02* (2013.01); *B32B 2307/30* (2013.01); *B32B 2311/00* (2013.01); *B32B 2367/00* (2013.01); *B32B 2435/02* (2013.01); *B32B 2439/00* (2013.01); *B32B 2439/66* (2013.01); *C08L 67/00* (2013.01); *C08L 67/03* (2013.01); *C09D 167/00* (2013.01); *C09D 167/03* (2013.01); *Y10T 428/265* (2015.01); *Y10T 428/31681* (2015.04); *Y10T 428/31786* (2015.04)

(56) References Cited

U.S. PATENT DOCUMENTS

| | | | | |
|---|---|---|---|---|
| 6,025,056 | A | * 2/2000 | Machii | B32B 15/08 428/204 |
| 2003/0039778 | A1 | * 2/2003 | Sato | B32B 15/08 428/35.7 |
| 2005/0100749 | A1 | * 5/2005 | Hu | B32B 15/08 428/461 |
| 2005/0118442 | A1 | * 6/2005 | Itoh | B32B 15/08 428/480 |
| 2007/0031688 | A1 | * 2/2007 | Suzuki | B32B 15/08 428/458 |
| 2008/0241448 | A1 | * 10/2008 | Sato | B32B 15/08 428/35.8 |
| 2010/0167016 | A1 | * 7/2010 | Manabe | B29C 45/1418 428/161 |

FOREIGN PATENT DOCUMENTS

| | | | |
|---|---|---|---|
| JP | 2851468 B2 | | 1/1999 |
| JP | 2002-173541 | | 6/2002 |
| JP | 2003-026824 A | | 1/2003 |
| JP | 2003-213104 A | | 7/2003 |
| JP | 2003-268131 A | * | 9/2003 |
| JP | 2005-153319 A | | 6/2005 |
| JP | 2005-153320 A | * | 6/2005 |
| JP | 2008-143184 A | | 6/2008 |
| JP | 2009-078540 A | * | 4/2009 |

* cited by examiner

ORGANIC-RESIN-COATED METAL SHEET, PROCESS FOR PRODUCING SAME, METALLIC CAN OBTAINED BY PROCESSING SAID ORGANIC-RESIN-COATED METAL SHEET, AND CAN LID

CROSS-REFERENCE TO RELATED APPLICATIONS

This application is a U.S. National Phase application, under 35 U.S.C. § 371, of International Application no. PCT/JP2014/069209, with an international filing date of Jul. 18, 2014, and claims benefit of Japanese Application no. JP 2013-151407 filed on Jul. 22, 2013, and which are hereby incorporated by reference for all purposes.

TECHNICAL FIELD

The present invention relates to an organic-resin-coated metal sheet, a manufacturing method thereof, and a metal can and a can lid that are made by processing the organic-resin-coated metal sheet, and specifically relates to an organic-resin-coated metal sheet in which retort blushing (white spots) does not occur at the time of retort sterilization treatment of a metal can, a manufacturing method thereof, and a metal can and a can lid that are made by processing the organic-resin-coated metal sheet.

BACKGROUND ART

Normally metal cans for various kinds of beverages and foods are manufactured as a three-piece metal can composed of a can body and top and bottom lids or a seamless metal can such as a two-piece can composed of a can body and a can lid.

Meanwhile, in order to prevent corrosion of the metal cans, a metal sheet coated by sticking a thermoplastic resin film to a surface of the metal sheet instead of conventional paint application is used for the metal cans. As this thermoplastic resin film used for the metal cans, a polyester film, particularly a copolymerized polyester film composed mainly of a polyethylene terephthalate-based resin, is used.

When these metal cans are used for the purposes of various kinds of beverages such as coffee, black tea, and tea and foods, normally retort sterilization treatment by steam at 110 to 140° C. is performed. There is a problem that water droplets adhere to the can lid of the three-piece metal can and the can bottom part of the seamless two-piece metal can at the time of this retort sterilization treatment and the film that was melted to become an amorphous state at the time of laminating is crystallized at these droplet-adhering parts and retort blushing (white spots) occurs. Therefore, various studies have been made.

As related arts to prevent the retort blushing (white spots), for example in PTL 1 (JP 1995-145252 A), a stretched film composed of a polyester composition that has a crystallization temperature of 65 to 130° C., a crystallization half time of 100 seconds or shorter, a second-order transition point of 40° C. or higher, and a melting point of 260° C. or lower and is obtained by mixing ethylene terephthalate and butylene terephthalate is described as a coating transparent film that is stuck to a metal can lid and is free from the occurrence of retort blushing (white spots).

In PTL 2 (JP 1995-330924 A), as a film excellent in the retort resistance, a metal-stuck stretched polyester film for forming processing is described that is a polyester film composed of 99 to 60 wt % of polyester having a melting point of 210 to 245° C. and a glass transition temperature of 60° C. or higher and 1 to 40 wt % of polyester that has a melting point of 180 to 223° C. and is composed mainly of polybutylene terephthalate, and has at most 300 ppm of free monomers.

In PTL 3 (JP 2003-268131 A), as a film that is excellent in design and is used to laminate a metal sheet and is free from whitening even when the film is subjected to heat treatment around the melting point or higher, the following polyester film is described. Specifically, the film is composed of 10 to 70 wt % of ethylene terephthalate and 90 to 30 wt % of crystalline polyester. The crystalline polyester is any of polybutylene terephthalate (PBT), polytrimethylene terephthalate (PTT), and polyethylene-2,6-naphthalate (PEN). In the film, the half width of the recrystallization peak in a temperature decrease is equal to or smaller than 0.2.

In PTL 4 (JP 2008-143184 A), as a laminated metal sheet for a metal can body and a can lid material in which whitening of a film does not occur even when the film is subjected to crystallization treatment, a metal laminated sheet is described that is obtained by mixing 10 to 70 wt % of a polyethylene terephthalate-based resin and 90 to 30 wt % of a polybutylene terephthalate-based resin and has two or more melting point peaks.

CITATION LIST

Patent Literature

[PTL 1]
JP 1995-145252 A
[PTL 2]
JP 1995-330924 A
[PTL 3]
JP 2003-268131 A
[PTL 4]
JP 2008-143184 A

SUMMARY

Technical Problem

However, in the polyester films that are described in the related arts and are obtained by mixing a polyethylene terephthalate-based resin and a polybutylene terephthalate-based resin, it cannot be said that the performance of the films is sufficient to prevent retort blushing (white spots) at the time of retort sterilization treatment corresponding to diversified contents and can manufacturing method.

Accordingly, the present invention intends to provide an organic-resin-coated metal sheet for beverages and foods that is obtained by mixing copolymerized polyester composed mainly of a polyethylene terephthalate-based resin and crystalline polyester composed mainly of a polybutylene terephthalate-based resin and has sufficient retort blushing resistance and can manufacturability through suppression of the transesterification reaction, a manufacturing method thereof, and a metal can and a can lid that are made by processing the organic-resin-coated metal sheet.

Solution to Problem (1) An organic-resin-coated metal sheet according to the present invention is an organic-resin-coated metal sheet in which an unstretched film is stacked on at least a single surface of a metal sheet, and is characterized in that the unstretched film is composed of a polyester-based resin composition obtained by blending copolymerized polyester (I) composed mainly of a polyethylene terephthalate-based resin with crystalline polyester (II) composed mainly of a polybutylene terephthalate-based resin with a mixing amount of the crystalline polyester (II) of 20 to 45 wt %.

(2) The organic-resin-coated metal sheet according to the present invention is characterized in that, in the above-described (1), the crystalline polyester (II) composed mainly of the polybutylene terephthalate-based resin is homopolyester.

(3) The organic-resin-coated metal sheet according to the present invention is characterized in that, in the above-described (1) or (2), a height H of a recrystallization peak in a temperature decrease in differential scanning calorimetry (DSC) of the unstretched film stacked on at least the single surface of the metal sheet is in a range of 0.8 mW≤H<2.0 mW.

(4) The organic-resin-coated metal sheet according to the present invention is characterized in that, in any one of the above-described (1) to (3), a recrystallization peak in a temperature decrease in differential scanning calorimetry (DSC) of the unstretched film stacked on at least the single surface of the metal sheet has one peak.

(5) The organic-resin-coated metal sheet according to the present invention is characterized in that, in any one of the above-described (1) to (4), the unstretched film composed of the polyester-based resin composition is a film formed by an extrusion coating method in which the unstretched film is extruded into a thin film shape through a die head of an extruder and is pressure-bonded and thermally bonded to the metal sheet by a laminating roll.

(6) The organic-resin-coated metal sheet according to the present invention is characterized in that, in any one of the above-described (1) to (5), a thickness of the unstretched film composed of the polyester-based resin composition is 5 to 15 μm.

(7) A metal can according to the present invention is characterized by being made by processing the organic-resin-coated metal sheet of any one of the above-described (1) to (6).

(8) A can lid according to the present invention is characterized by being made by processing the organic-resin-coated metal sheet of any one of the above-described (1) to (6).

(9) A manufacturing method of an organic-resin-coated metal sheet according to the present invention is a manufacturing method of an organic-resin-coated metal sheet in which a polyester-based resin composition obtained by blending copolymerized polyester (I) composed mainly of a polyethylene terephthalate-based resin with crystalline polyester (II) composed mainly of a polybutylene terephthalate-based resin is stacked on at least a single surface of a metal sheet by an extrusion coating method, and is characterized in that a mixing amount of the crystalline polyester (II) is set to 20 to 45 wt % in the resin composition, and an unstretched film extruded through a die head of an extruder is pressure-bonded and thermally bonded to at least the single surface of the metal sheet by a laminating roll under conditions in which a kneading temperature in the extruder is 255° C.≤kneading temperature<295° C., a ratio of "a discharge amount in the extruder/rotation speed of an extruder screw" is 0.8<Q/N≤1.6, where Q=the discharge amount in the extruder (kg/h)

N=the rotation speed of the extruder screw (rpm), and a residence time in the extruder is 5 to 20 minutes.

(10) The manufacturing method of an organic-resin-coated metal sheet according to the present invention is characterized in that, in the above-described (9), heat treatment under a following condition is performed in any step that is after stacking of the polyester-based resin composition on the metal sheet through the die head of the extruder and before execution of retort sterilization treatment, where the condition is: a combination condition of a heat treatment temperature (° C.) and a heat treatment time (seconds) indicated by coordinates (heat treatment temperature, heat treatment time) in a region formed by sequentially linking A (80° C., 120 seconds), B (60° C., 600 seconds), C (220° C., 600 seconds), D (220° C., 30 seconds), E (120° C., 30 seconds), F (100° C., 60 seconds), and A (80° C., 120 seconds) by straight lines in coordinates in a graph in which an abscissa is defined as the heat treatment temperature and an ordinate is defined as the heat treatment time.

Advantageous Effects of Invention

In the organic-resin-coated metal sheet according to the present invention and the metal can and the can lid that are made by processing the organic-resin-coated metal sheet, the unstretched film composed of the polyester-based resin composition obtained by blending (mixing) the copolymerized polyester composed mainly of the polyethylene terephthalate-based resin and the polyester composed mainly of the polybutylene terephthalate-based resin with a predetermined mixing amount is stacked on the metal sheet. Thus, the occurrence of retort blushing (white spots) can be suppressed at the time of retort sterilization treatment and the metal can and the can lid provide excellent effects as ones for beverages and foods.

Furthermore, according to the manufacturing method of an organic-resin-coated metal sheet in accordance with the present invention, the transesterification reaction is suppressed by performing extrusion with control of the kneading temperature of the above-described polyesters in the extruder, the ratio of "the discharge amount in the extruder/ the rotation speed of the extruder screw," and the residence time. Thus, an organic-resin-coated metal sheet allowing suppression of the occurrence of retort blushing at the time of retort sterilization treatment can be manufactured.

DESCRIPTION OF EMBODIMENTS

Figure 1:
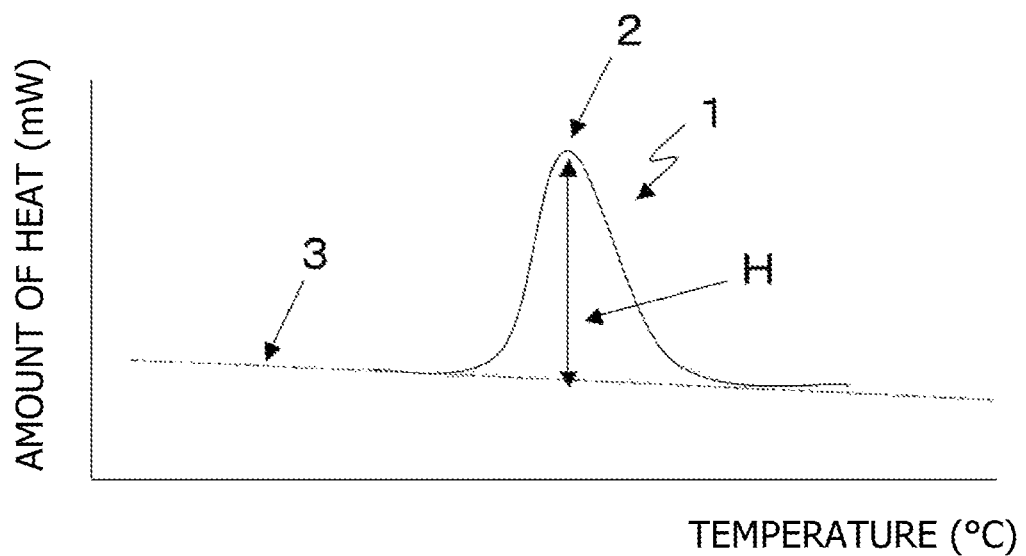
FIG. 1 is a schematic diagram of a chart indicating a recrystallization peak in a temperature decrease by differential scanning calorimeter (DSC) of a polyester-based resin composition.

An embodiment of the present invention will be described in detail below.

An organic-resin-coated metal sheet of the present invention is an organic-resin-coated metal sheet in which an unstretched film is stacked on at least a single surface of a metal sheet, and is characterized in that the unstretched film is composed of a polyester-based resin composition obtained by blending copolymerized polyester (I) composed mainly of a polyethylene terephthalate-based resin with crystalline polyester (II) composed mainly of a polybutylene terephthalate-based resin with a mixing amount of the crystalline polyester (II) of 20 to 45 wt %.

For metal cans used for the purposes of various kinds of beverages such as coffee, black tea, and tea and foods, normally retort sterilization treatment by steam at 110 to 140° C. is performed.

There is a problem that water droplets adhere to the can lid of a three-piece metal can and the can bottom part of a seamless two-piece metal can at the time of this retort sterilization treatment and the film that was melted to become an amorphous state at the time of laminating is crystallized at these droplet-adhering parts and retort blushing (white spots) occurs.

To address such a problem, crystalline polyester composed mainly of a polybutylene terephthalate-based resin is mixed in copolymerized polyester composed mainly of a polyethylene terephthalate-based resin (in the present specification, "mix" is often referred to as "blend"). This makes it possible to suppress the retort blushing (white spots) that occurs at the time of the retort sterilization treatment by the polybutylene terephthalate with high crystallinity.

Furthermore, the organic-resin-coated metal sheet of the present invention is characterized in that the crystalline polyester (II) composed mainly of the polybutylene terephthalate-based resin is homopolyester.

The crystalline polyester (II) composed mainly of the polybutylene terephthalate-based resin is a polymer composed of a dicarboxylic acid component and a glycol component.

It is preferable that this crystalline polyester (II) be homopolybutylene terephthalate (PBT).

The crystalline polyester (II) may be copolymerized polyester obtained by further copolymerization of another dicarboxylic acid component and/or a glycol component with this homopolyester. However, the homopolyester has a higher crystallization rate than the copolymerized polyester and therefore can suppress the occurrence of retort blushing more through formation of microcrystalline nuclei.

Furthermore, the organic-resin-coated metal sheet of the present invention is characterized in that the height H of the recrystallization peak in a temperature decrease in differential scanning calorimetry (DSC) of the unstretched film stacked on at least the single surface of the metal sheet is in a range of 0.8 mW≤H<2.0 mW.

To enhance the effect of suppressing retort blushing (white spots) of the blended polyester-based resin composition, blending crystalline polyester having a high crystallization rate and a high intrinsic viscosity is important besides the above-described mixing ratio of the crystalline polyester.

Moreover, it is also important to suppress a transesterification reaction of the blended resin (crystalline polyester) as much as possible in an extruder at the time of blending.

For the suppression of the transesterification reaction, the kneading temperature and kneading time of the resin in the extruder are important parameters.

When the kneading temperature is high, the transesterification reaction readily proceeds and pyrolysis starts. Consequently, the molecular weight decreases.

Furthermore, the transesterification reaction proceeds more readily when the residence time in the extruder is longer. Thus, it is important to set the degree of kneading low.

It is preferable that the kneading temperature be lower than 295° C., and the kneading temperature is more preferably 255 to 285° C.

When the kneading temperature is equal to or higher than 295° C., the transesterification reaction readily proceeds and retort blushing (white spots) readily occurs.

When the kneading temperature is lower than 255° C., the blended resin does not sufficiently melt and the pressure in the extruder becomes high, which makes the kneading itself difficult.

Regarding the degree of kneading, it is preferable that Q/N as the ratio of the discharge amount Q (kg/h) in the extruder to the rotation speed N (rpm) of an extruder screw surpass 0.8, and Q/N is more preferably in a range of 1.0≤Q/N≤1.6.

Furthermore, it is preferable that the residence time of the blended resin in the extruder be 5 to 20 minutes. If the above-described kneading temperature and the degree of kneading based on Q/N and the residence time are satisfied, H, which is considered as a criterion indicating the degree of progression of the transesterification reaction, i.e. the height H of the recrystallization peak in a temperature decrease in DSC of the blended polyester-based resin composition, is equal to or higher than 0.8 mW, and thus it is possible to prevent the occurrence of retort blushing (white spots).

Furthermore, the organic-resin-coated metal sheet of the present invention is characterized in that the recrystallization peak in a temperature decrease in differential scanning calorimetry (DSC) of the unstretched film stacked on at least the single surface of the metal sheet has one peak.

For forming of a seamless metal can, it is necessary to prevent separation (delamination) of the polyester-based resin composition at a flange part in a flanging step particularly in a forming step. For this purpose, kneading of the polyester-based resin composition at an appropriate degree is necessary.

To prevent the occurrence of retort blushing (white spots), it is necessary to set the kneading temperature and the degree of kneading low. However, if the kneading temperature and the degree of kneading are set too low, delamination occurs at the flange part of the seamless metal can in some cases. In particular, the delamination readily occurs at the flange part if flanging processing is performed on a seamless metal can subjected to severe forming processing such as drawing forming, drawing-redrawing forming, stretch-draw forming, stretch-ironing forming, and drawing-ironing forming.

If the polyethylene terephthalate-based resin and the polybutylene terephthalate-based resin are not uniformly mixed in the kneading, such delamination will occur.

It is difficult to grasp whether the resins are uniformly mixed on the basis of only the kneading conditions. However, if uniform mixing in the kneading fails, the recrystallization peak in a temperature decrease in differential scanning calorimetry (DSC) appears as two peaks. Therefore, it is important that the recrystallization peak in a temperature decrease in differential scanning calorimetry (DSC) has one peak as the kneaded state allowing necking processing.

Furthermore, the organic-resin-coated metal sheet of the present invention is characterized in that the unstretched film composed of the polyester-based resin composition is a film formed by an extrusion coating method in which the unstretched film is extruded into a thin film shape through a die head (T-die) of an extruder and is pressure-bonded and thermally bonded to a metal sheet by a laminating roll.

By stacking the polyester-based resin composition on the outer surface side of a can to become a seamless metal can, retort blushing (white spots) that occurs in the surfaces of the can bottom and can lid of the seamless metal can at the time of retort sterilization treatment can be prevented.

Furthermore, by the extrusion coating method, the unstretched film composed of the polyester-based resin composition with a smaller thickness can be stacked on the metal sheet.

In addition, the organic-resin-coated metal sheet of the present invention is characterized in that the thickness of the unstretched film composed of the polyester-based resin composition is 5 to 15 μm.

Setting the thickness of the polyester-based resin composition equal to or smaller than 15 μm can suppress hairs at the time of blanking and trimming in can manufacturing and lid manufacturing and keep the design based on the metal color of the underlying metal.

Moreover, because the stacked polyester-based resin composition is the unstretched film of a thin film, it becomes possible to obtain a seamless metal can by a severe forming method such as drawing forming, drawing-redrawing forming, stretch-draw forming, stretch-ironing forming, and drawing-ironing forming.

Furthermore, it suffices that the thickness of the polyester-based resin composition stacked on the outer surface side of the seamless metal can is a necessary minimum film thickness to withstand rust in storage. Thus, because more thickness reduction can be achieved, cost reduction is enabled.

The organic-resin-coated metal sheet of the present invention and a manufacturing method of the organic-resin-coated metal sheet will be described in detail below.

(Metal Sheet)

In the organic-resin-coated metal sheet of the present invention, as the metal sheet as a base (often referred to as an original sheet) on which the unstretched film is stacked, various kinds of surface-treated steel sheets and light metal sheets such as aluminum sheets and aluminum alloy sheets can be used.

As the surface-treated steel sheets, component-based steel sheets of aluminum-killed steel, low-carbon steel, etc. conventionally used for steel sheets for metal cans can be used without a problem.

As the thickness and temper of the steel sheet, a grade suitable for the use purpose may be selected. A steel sheet can be used that is obtained by subjecting a cold-rolled steel sheet to secondary cold rolling after annealing and subjecting the resulting steel sheet to one kind or two or more kinds among tin plating, nickel plating, zinc plating, electrolytic chromic acid treatment, chromic acid treatment, non-chromium treatment by use of aluminum or zirconium, and so forth.

As the light metal sheets, aluminum sheets and aluminum alloy sheets used for so-called metal cans are used.

As the aluminum alloy sheets, A3000 series (Al—Mn series) can be used as a metal can body material and A5000 series (Al—Mg series) can be used as a can lid material.

Furthermore, as the thickness and temper of the original sheet, a grade suitable for the use purpose can be selected.

(Polyethylene Terephthalate-based Resin)

In the organic-resin-coated metal sheet of the present invention, the polyester-based resin composition obtained by mixing copolymerized polyester (I) composed mainly of a polyethylene terephthalate-based resin and crystalline polyester (II) composed mainly of a polybutylene terephthalate-based resin is stacked on at least a single surface of the above-described metal sheet.

Next, the copolymerized polyester (I) composed mainly of a polyethylene terephthalate-based resin will be described.

The copolymerized polyester (I) composed mainly of a polyethylene terephthalate (PET)-based resin refers to polyester in which 80 mol % or higher of the polyester component is ethylene terephthalate.

The copolymerized polyester (I) is a polymer composed of a dicarboxylic acid component and a glycol component. It is preferable to mix, as an acid component other than terephthalic acid, at least one kind selected from a group consisting of isophthalic acid (IA), orthophthalic acid, P-β-oxyethoxybenzoic acid, naphthalate-2,6-dicarboxylic acid, diphenoxyethane-4,4'-dicarboxylic acid, 5-sodium sulfoisophthalic acid, hexahydroterephthalic acid, adipic acid, sebacic acid, trimellitic acid, and pyromellitic acid.

Furthermore, it is preferable that the glycol component be composed only of ethylene glycol. However, in such a range as not to impair the essence of the present invention, the copolymerized polyester (I) may contain another glycol component, e.g. one kind or two or more kinds among propylene glycol, 1,4-butanediol, diethylene glycol, 1,6-hexylene glycol, cyclohexanedimethanol, ethylene oxide adduct of bisphenol A, and so forth.

Copolymerization by addition of isophthalic acid as an acid component is more preferable and addition of 7 to 15 mol % of isophthalic acid is more preferable.

To perform can lid forming or can body forming of a seamless metal can such as a drawn and ironed can, the blended resin needs to follow these kinds of forming processing and have adhesiveness to the metal sheet. For this purpose, 7 mol % or higher of isophthalic acid is necessary.

Increasing isophthalic acid allows the blended resin to follow the forming processing more easily. However, 15 mol % or lower is more preferable because the increasing reduces the crystallization rate of the resin and causes retort blushing.

Therefore, it is preferable to set the melting point of the above-described copolymerized polyester (I) to 210 to 230° C.

(Polybutylene Terephthalate-based Resin)

Next, the crystalline polyester (II) composed mainly of a polybutylene terephthalate-based resin will be described.

The crystalline polyester (II) composed mainly of a polybutylene terephthalate-based resin is a polymer composed of a dicarboxylic acid component and a glycol component.

It is preferable that this crystalline polyester (II) be homopolybutylene terephthalate (PBT). However, the crystalline polyester (II) may be copolymerized polyester obtained by further copolymerization of another dicarboxylic acid component and/or a glycol component with this homopolybutylene terephthalate.

As an acid component other than terephthalic acid, at least one kind of acid selected from a group consisting of the following acids is preferable: isophthalic acid, orthophthalic acid, P-β-oxyethoxybenzoic acid, naphthalate-2,6-dicarboxylic acid, diphenoxyethane-4,4'-dicarboxylic acid, 5-sodium sulfoisophthalic acid, hexahydroterephthalic acid, adipic acid, sebacic acid, trimellitic acid, and pyromellitic acid.

Furthermore, it is preferable that the glycol component be composed only of butylene glycol. However, in such a range as not to impair the essence of the present invention, the crystalline polyester (II) may contain, as a diol component other than butylene glycol, one kind or two or more kinds among ethylene glycol, propylene glycol, diethylene glycol, 1,6-hexylene glycol, cyclohexanedimethanol, ethylene oxide adduct of bisphenol A, and so forth.

The melting point of this crystalline polyester (II) is preferably 215 to 225° C.

Furthermore, it is preferable that the intrinsic viscosity (IV) of this crystalline polyester (II) be 0.6 to 1.3, and it is more preferable that the intrinsic viscosity be 1.1 to 1.3.

If the intrinsic viscosity is lower than 0.6, the resin is soft and outer surface chipping occurs in the can manufacturing step. If the intrinsic viscosity surpasses 1.3, the intrinsic viscosity is too high and the film forming itself is difficult.

(Polyester-based Resin Composition)

Next, a description will be made about the polyester-based resin composition obtained by blending the copolymerized polyester (I) and the crystalline polyester (II).

In the present embodiment, the polyester-based resin composition stacked on at least a single surface is a polyester-based resin composition obtained by blending the copolymerized polyester (I) composed mainly of a polyethylene terephthalate-based resin with the crystalline polyester (II) composed mainly of a polybutylene terephthalate-based resin, and is characterized in that the mixing amount of the crystalline polyester (II) is 20 to 45 wt % in the resin composition.

If the mixing amount of the crystalline polyester (II) is smaller than 20 wt %, the crystallization rate of the crystalline polyester composed mainly of polybutylene terephthalate is low and thus retort blushing occurs.

Furthermore, because the mixing amount of the crystalline polyester (II) is small, abrasion at the time of conveyance of metal cans readily occurs due to the influence of the copolymerized polyester (I).

As the mixing amount of the crystalline polyester (II) is increased, the crystallization rate increases and the occurrence of retort blushing is suppressed due to generation of microcrystalline nuclei.

With the mixing beyond 45 wt %, the crystallization rate of the crystalline polyester (II) is too high and thus coarse crystal grains grow. Accordingly, the whole surface of the polyester-based resin composition becomes cloudy white.

Therefore, in the copolymerized polyester (I), the crystalline polyester (II) is blended in a range of 20 to 45 wt %.

To enhance the effect of suppressing retort blushing (white spots) of the blended substance (polyester-based resin composition obtained by blending the copolymerized polyester (I) with the crystalline polyester (II), the crystalline polyester (II) ranging from 20 to 45 wt %), blending crystalline polyester having a high crystallization rate and a high intrinsic viscosity is important besides the above-described mixing ratio, and it is preferable that the crystalline polyester (II) be homopolybutylene terephthalate (PBT).

Furthermore, it is preferable to set the intrinsic viscosity (IV) of the crystalline polyester (II) to 0.6 to 1.3.

Moreover, it is more important to suppress a transesterification reaction of the blended resin as much as possible in an extruder at the time of blending.

As methods for suppressing the transesterification reaction, there are e.g. the following methods: a method in which chips of the copolymerized polyester (I) and the crystalline polyester (II) to be blended are mixed before being loaded into an extruder and these mixed chips are loaded into the extruder to be melted and mixed; and a method in which chips of the copolymerized polyester (I) and chips of the crystalline polyester (II) are loaded into different extruders and melted without being mixed and the copolymerized polyester (I) and the crystalline polyester (II) melted in these different extruders are mixed before being pushed out from a die, and led to the die to be melted and mixed. Although any method may be used, the temperature and the time at the time of kneading in the extruder are important parameters to suppress the transesterification reaction.

When the kneading temperature is high, the transesterification reaction readily proceeds and pyrolysis starts. Consequently, the molecular weight decreases.

The transesterification reaction proceeds more readily when the residence time in the extruder is longer. Thus, it is important to set the degree of kneading low by controlling the discharge amount and the kneading time.

It is preferable that the kneading temperature be 255° C. ≤kneading temperature<295° C., and the kneading temperature is more preferably 255 to 285° C.

When the kneading temperature is equal to or higher than 295° C., the transesterification reaction proceeds and retort blushing (white spots) occurs. When the kneading temperature is lower than 255° C., the blended resin does not sufficiently melt and the pressure in the extruder becomes high, which makes the kneading itself difficult.

The degree of kneading further varies depending on the residence time of the resin in the extruder and the ratio of "the discharge amount in the extruder/the rotation speed of the extruder screw."

As the degree of kneading, it is preferable that the Q/N ratio as the ratio of the discharge amount Q (kg/h) to the rotation speed N (rpm) of the extruder screw surpasses 0.8, and the Q/N ratio is more preferably in a range of 1.0≤Q/N≤1.6.

Furthermore, it is preferable that the residence time of the blended resin in the extruder be 5 to 20 minutes.

The degree of kneading becomes too high if the Q/N ratio falls below this range, and the degree of kneading becomes too low if Q/N exceeds this range. Furthermore, the degree of kneading becomes too low if the residence time of the blended resin in the extruder falls below this range, and the degree of kneading becomes too high if the residence time exceeds this range.

If the degree of kneading becomes too high, the transesterification reaction proceeds and retort blushing (white spots) readily occurs. Conversely, when the degree of kneading is lower, the transesterification reaction is suppressed more, which is more effective in prevention of the retort blushing (white spots). However, if the degree of kneading is too low, the mixed resins fail to be uniformly mixed in the kneading and separation (delamination) occurs in necking processing of a can body in some cases.

For this reason, although retort blushing can be prevented by managing the kneading temperature and the degree of kneading in the above-described appropriate ranges, it cannot be said that this management is sufficient when the formability of the can body is also included.

Accordingly, in the present invention, the proper degree of progression of the transesterification reaction and the proper uniformity of the mixed resins regarding retort blushing based on kneading of the mixed resins are detected from the recrystallization peak of the polyester-based resin composition obtained by a differential scanning calorimeter (DSC).

Specifically, it is preferable to set the height H of the recrystallization peak, which is considered as a criterion indicating the degree of progression of the transesterification reaction, i.e. the height H of the recrystallization peak of the blended polyester-based resin composition in a DSC temperature decrease, in a range of 0.8 mW≤H<2.0 mW, i.e. equal to or higher than 0.8 mW and lower than 2.0 mW. By setting the height H in this range, the occurrence of retort blushing (white spots) can be prevented.

In this range, the retort blushing will not occur due to generation of microcrystalline nuclei of PBT.

If the height H is lower than 0.8 mW, the transesterification reaction of PBT as a crystalline resin and PET proceeds and thus the generation rate of crystal nuclei of PBT decreases, so that retort blushing occurs.

Furthermore, the polyester-based resin composition becomes readily stretchable due to the progression of the transesterification reaction, and possibly hairs of the film are caused.

If the height H is equal to or higher than 2.0 mW, the crystallization rate of PBT as a crystalline resin is too high and thus crystal nuclei become coarse crystal grains, so that an appearance defect due to cloudy whitening of the film whole surface occurs.

Therefore, although setting the kneading temperature and the degree of kneading low is necessary to prevent the occurrence of retort blushing (white spots) as described above, if the kneading temperature and the degree of kneading are set too low, possibly abrasion at the time of conveyance of metal cans and delamination of the polyester-based resin composition at the flange part of a seamless metal can occur.

In particular, the delamination readily occurs at the flange part if flanging processing is performed on a seamless metal can subjected to severe forming processing such as drawing forming, drawing-redrawing forming, stretch-draw forming, stretch-ironing forming, and drawing-ironing forming.

Such delamination of the polyester-based resin composition readily occurs when the kneading temperature and the degree of kneading are set low in order to suppress the occurrence of retort blushing, and that the polyethylene terephthalate-based resin and the polybutylene terephthalate-based resin are not uniformly mixed in the kneading will be cause.

It is difficult to grasp whether the resins are uniformly mixed on the basis of only the kneading conditions. However, in this case, because the mixing in the kneading is non-uniform, the recrystallization peak in a temperature decrease in differential scanning calorimetry (DSC) appears as two peaks, which allows detection.

Furthermore, as the mixing amount of the crystalline polyester (II) increases, the crystallization rate increases and the adhesiveness lowers due to the crystallization.

Moreover, the crystalline polyester (II) as the polybutylene terephthalate-based resin has a low glass transition point (Tg), and increase in the mixing amount of the crystalline polyester (II) causes the polyester-based resin composition to become a readily-stretchable state.

The glass transition point (Tg) of homopolybutylene terephthalate (PBT) is around 35° C.

Therefore, in the case of mixing in which the mixing amount of the crystalline polyester (II) surpasses 45 wt %, the crystallization rate is too high and thus the adhesiveness further lowers. In addition, because the glass transition point (Tg) of the crystalline polyester (II) is low, hairs of the film or cutting failure of the film at the time of blanking and trimming occurs and delamination at the flange part and adhesion failure of ink occur.

(Stacking of Polyester-based Resin Composition on Metal Sheet)

The organic-resin-coated metal sheet of the present invention is obtained by stacking a film composed of the above-described polyester-based resin composition on at least a single surface of various kinds of surface-treated steel sheets, aluminum alloy sheets, or the like to coat the single surface.

As a method for the stacking and coating, either method of the following methods may be used: an extrusion coating method in which the film is extruded into a thin film shape through a die head (T-die) of an extruder and is directly pressure-bonded and thermally bonded directly to a metal sheet by a laminating roll; and a method in which the film is extruded into a thin film shape through a die head (T-die) of an extruder and is temporarily rolled up into a film shape and then pressure-bonded and thermally bonded to a metal sheet by a laminating roll. The extrusion coating method is desirable in forming into a thin film, the productivity, and the handling characteristic.

By extruding the polyester-based resin composition directly onto a metal sheet by the extrusion coating method, an unstretched film of a thinner film can be stacked on the metal sheet.

In the case of using a transparent film on a can outer surface in a seamless metal can, the metal color of the underlying metal is important as design, and it is desirable to set the thickness of the unstretched film composed of the polyester-based resin composition to 5 to 15 μm.

If the thickness surpasses 15 μm, due to the effect of the thickness of the polyester-based resin composition, the design based on the metal color of the underlying metal is inhibited and hairs of the resin are prominently caused in the case of punching a blank in can manufacturing or lid manufacturing and at the time of trimming of a can body.

If the thickness is smaller than 5 μm, control of the thickness in forming into the unstretched film by the extruder and the film forming itself are difficult.

Accordingly, to avoid inhibition of the design based on the metal color of the base and suppress the hairs at the time of blanking and trimming, it is desirable to set the thickness of the unstretched film to 5 to 15 μm and it is more preferable to set the thickness to 5 to 10 μm.

(Manufacturing of Metal can)

Next, a description will be made about a metal can made by processing the organic-resin-coated metal sheet of the present invention.

The metal can made by processing the organic-resin-coated metal sheet of the present invention can be manufactured by subjecting the organic-resin-coated metal sheet obtained in the above-described manner to various kinds of forming methods such as drawing forming, drawing-redrawing forming, stretch-draw forming, stretch-ironing forming, and drawing-ironing forming.

The formed can is subjected to trimming processing immediately after the forming. The trimming processing is performed by clamping the can body by a can body inside cutter and a can body outside cutter that each rotate and shear-cutting the upper part of the can body. After the trimming processing, the can is subjected to at least one stage of heat treatment to remove the residual strain of the film caused by the processing and volatilize a lubricant used in the processing from the surface. Furthermore, printing ink is applied and printed on the can body outer surface and finishing varnish is applied on the outer surface side thereof.

Then, the applied materials are cured by baking by performing baking in a curing oven at 160 to 220° C. for 30 seconds to 15 minutes. The can after the heat treatment is rapidly cooled or is left to cool. Then, according to desire, the can is subjected to neck-in processing into a one-stage or multistage shape based on die-neck processing or a smooth shape based on roll processing or die-neck processing. Then, flange processing is performed to obtain a seamless metal can body for can lid seaming.

Furthermore, in the metal can of the present invention, publicly-known thermosetting white coat, thermosetting ink, and thermosetting finishing varnish can be used, and they are applied on the can body and then subjected to baking by a baking oven to be cured as described above.

(Manufacturing of can Lid)

Next, a description will be made about a can lid made by processing the organic-resin-coated metal sheet of the present invention.

The can lid of the present invention can be manufactured by processing the organic-resin-coated metal sheet obtained in the above-described manner into lid shape and can lid diameter according to the can type for various kinds of use purposes.

Furthermore, according to desire, thermosetting finishing varnish is applied on the can lid outer surface side and then is cured by baking by performing baking in a curing oven at 160 to 220° C. for 30 seconds to 15 minutes.

(Heat Treatment of Organic-resin-coated Metal Sheet, Metal can, and can Lid)

The effect of preventing retort blushing increases by performing heat treatment in any step that is after the stacking of the polyester-based resin composition on the metal sheet through the die head of the extruder and before execution of retort sterilization treatment.

Regarding the condition under which the above-described heat treatment is performed, it is preferable that the relationship between the temperature and the time of the heat treatment fall within a range shown in FIG. 5 as shown in working examples to be described later.

Specifically, the temperature-time relationships that fall within the range are coordinates (heat treatment temperature, heat treatment time) in a region formed by sequentially linking A (80° C., 120 seconds), B (60° C., 600 seconds), C (220° C., 600 seconds), D (220° C., 30 seconds), E (120° C., 30 seconds), F (100° C., 60 seconds), and A (80° C., 120 seconds) by straight lines, including coordinates on the boundary straight lines, in coordinates in a graph in which the abscissa is defined as the heat treatment temperature (° C.) and the ordinate is defined as the heat treatment time (seconds).

Furthermore, the above-described heat treatment may be performed in any step as long as the step is after the stacking of the polyester-based resin composition on the metal sheet through the die head of the extruder and before execution of retort sterilization treatment. For example, the heat treatment in the above-described range may be performed in any step of a stacking step of extruding the polyester-based resin composition directly onto the metal sheet, a step of processing the organic-resin-coated metal sheet obtained by the extrusion of the polyester-based resin composition onto the metal sheet into the metal can, or a step of processing the organic-resin-coated metal sheet into the can lid.

If the relationship between the temperature and the time of the above-described heat treatment falls within the above-described range, microcrystalline nuclei of PBT are generated, which provides the effect of suppressing retort blushing that occurs due to water droplets adhering to the can bottom or can lid in retort sterilization treatment.

WORKING EXAMPLES

The present invention will be specifically described below by using working examples and comparative examples.

Working Example 1

In working example 1, an organic-resin-coated metal sheet was manufactured in the following manner and the recrystallization peak temperature (Tc) and the recrystallization peak height (H) were measured.

Furthermore, the manufactured organic-resin-coated metal sheet for a can body was subjected to a drawing-ironing processing method to manufacture a metal can. In addition, a can lid was manufactured by using the organic-resin-coated metal sheet for the can lid. Moreover, the states of retort blushing of the can body and the can lid and delamination at the can body flange part were evaluated.

(Metal Sheet)

As the metal sheet for the can body, an Al—Mn-based aluminum alloy sheet of JIS A3004P H 19 material with a sheet thickness of 0.3 mm was used.

As the metal sheet for the can lid, a surface-treated cold-rolled steel sheet (TFS) with a sheet thickness of 0.25 mm for which electrolytic chromic acid treatment was performed was used.

(Polyester-based Resin Composition)

As the polyethylene terephthalate-based resin, the copolymerized polyester (I) in which 12 mol % of the polyester component was isophthalic acid and the intrinsic viscosity (IV) was 0.9 was used.

As the polybutylene terephthalate-based resin, the crystalline polyester (II) that was homopolybutylene terephthalate (PBT) and had intrinsic viscosity (IV) of 1.17 was used.

Here, the intrinsic viscosity (IV) of the copolymerized polyester (I) and the crystalline polyester (II) was obtained in the following manner.

About 200 mg of each resin of the copolymerized polyester (I) and the crystalline polyester (II) was dissolved in a phenol/1,1,2,2-tetrachloroethane mixed solution (weight ratio 1 to 1) at 110° C., and the specific viscosity at 30° C. was measured by using an Ubbelohde viscometer.

The intrinsic viscosity [η](dl/g) was obtained by the following expression.

$$[\eta]=[(-1+(1+4K'\eta_{sp})^{1/2})/2K'C]$$

K': Huggins constant (=0.33)
C: concentration (g/100 ml)
$\eta_{sp}$: specific viscosity [=(dropping time of solution−dropping time of solvent)/dropping time of solvent]

(Evaluation of Thermal Characteristics of Polyester-based Resin Composition)

The metal part of the obtained organic-resin-coated metal sheet was melted by acid and the polyester-based resin composition was separated. Thermal characteristics of the obtained polyester-based resin composition were evaluated as follows.

The melting point, the recrystallization peak, and the height H of the recrystallization peak of the polyester-based resin composition were obtained by using a differential scanning calorimeter (DSC), DSC 6220 made by SII Nanotechnology Inc.

The temperature of 5 mg of the separated resin composition was increased at a rate of 10° C./minute and the melting point (Tm) based on the melting peak was obtained. Then, after the temperature was kept at 290° C. for three minutes, the temperature was decreased at a rate of 10° C./minute and the recrystallization temperature (Tc) based on the recrystallization peak was obtained.

FIG. 1 is a diagram schematically showing a chart indicating the recrystallization peak in the temperature decrease by the differential scanning calorimeter (DSC) of the polyester-based resin composition. As the "height of the recrystallization peak" described in the present invention, the height from a baseline 3 to a peak top 2 in a recrystallization peak (chart) 1 of the polyester-based resin composition measured by the differential scanning calorimeter (DSC) was defined as H.

Furthermore, if two recrystallization peaks appeared, the heights H from the baseline 3 to the respective peaks 2 were measured and the respective heights were recorded in conjunction with each other.

In the present working example, the polyester-based resin composition obtained by mixing 30 wt % of the above-described crystalline polyester (II) in the above-described copolymerized polyester (I) was mixed before being loaded into an extruder, and kneading was performed by loading these mixed chips into the extruder and melting and mixing them.

As the kneading conditions, the kneading temperature was set to 255° C. and the degree of kneading was set to a normal degree of kneading, with Q/N being 1.0 and the residence time in the extruder being 20 minutes.

(Organic-resin-coated Metal Sheet)

The organic-resin-coated metal sheet was manufactured as follows. The above-described polyester-based resin composition was kneaded in the extruder. Then, the polyester-based resin composition that was heated and melted was extruded from a T-die into a film shape. The extruded polyester-based resin composition was nipped to the metal sheet surface to serve as the can outer surface side by a laminating roll through a pre-roll and was stacked on the above-described metal sheet for the metal can or for the can lid.

Furthermore, onto the metal sheet surface to serve as the can inner surface side, a polyethylene terephthalate-based copolymerized resin in which 15 mol % of the polyester component was isophthalic acid was extruded from a T-die of an extruder into a film shape and was stacked on the metal sheet simultaneously with the above-described stacking.

(Metal Can)

A wax lubricant was applied on this organic-resin-coated metal sheet and punching of a circular disc (blank) with a diameter of 166 mm was performed. Then, drawing processing was so performed that the surface on which the polyester-based resin composition was stacked would become the can body outer surface side, to manufacture a shallow-drawn cup.

Subsequently, ironing processing was performed for this shallow-drawn cup to manufacture a seamless cup with the following parameters.
Cup diameter: 66 mm
Cup height: 128 mm
Ironing rate (decrease rate of the thickness of the sidewall part with respect to the original sheet thickness): 50%
Can body bottom forming was performed for this seamless cup in accordance with an ordinary method and heat treatment was performed at 220° C. for 60 seconds. Subsequently, trimming of the opening end part was performed and then neck-in processing into 206-diameter and flange processing were performed to manufacture a seamless two-piece metal can for 350 ml.

(Can Lid)

As the metal sheet for the can lid, a surface-treated cold-rolled steel sheet (TFS) with a sheet thickness of 0.25 mm for which electrolytic chromic acid treatment was performed was used.

Except for this, an organic-resin-coated metal sheet was manufactured by the same method as the organic-resin-coated metal sheet for the above-described can body. Furthermore, finishing varnish was applied on the outer surface side and was dried at 100° C. for 60 seconds, and then a can lid with 206-diameter was so manufactured that the surface on which the polyester-based resin composition was stacked was on the outer surface side of the can lid.

(Film Thickness Measurement of Organic-resin-coated Metal Sheet)

The film thickness of the obtained organic-resin-coated metal sheet was measured from the resin surface by an electromagnetic film thickness meter.

(Evaluation of Generation of Hairs and Cut State of Film in Blanking and Trimming)

Generation of hairs of the film and the cut state of the film at the end surface of the blank-punched part of the can lid and the end surface of the can body trim part after the trimming processing were evaluated as follows by visual observation.

A: Hairs were not generated at the end surfaces of the blank and trim parts and the cut parts were favorable, so that practical use was possible.

B: Hairs within 1 mm were generated at the end surfaces of the blank and trim parts, but the cut parts were favorable and practical use was possible.

C: Hairs exceeding 1 mm were generated at the blank end surface or the film was not cut and the trim-target part adhered to the blank or trim part end surface, so that practical use was impossible.

(Evaluation of Abrasion of can Body Lower Part)

Metal cans for which heat treatment has been performed after the trimming processing are cooled and then pass through a conveyance lane to be conveyed to a printing step for the can outer surfaces. At this time, at a low position part in the can body height direction, a conveyance guide gets contact with the metal cans or the metal cans get contact with each other and the outer surface resin coat is partly peeled into splinters. If printing is performed to the partly-peeled part and baking is performed, the partly-peeled part thermally shrinks and the printing ink comes away, which leads to an appearance defect. This is referred to as abrasion. The occurrence of the abrasion was visually observed and was evaluated as follows.

A: Abrasion did not occur and practical use was possible.

B: A minute graze due to abrasion was found but practical use was possible.

C: A graze due to abrasion was caused and practical use was impossible.

(Evaluation of Delamination at Flange Part)

About the seamless two-piece metal can after the flange processing, the degree of separation of the outer surface resin at the flange tip was visually observed and the adhesiveness between the outer surface resin and the metal surface was evaluated as follows.

A: Separation did not occur and practical use was possible.

B: Slight separation was found but practical use was possible.

C: Obvious separation was found and practical use was impossible.

(Evaluation of Ink Adhesiveness of can Body Sidewall Part)

The ink adhesiveness was evaluated by a DuPont impact test.

The resin-coated seamless two-piece metal can after blanket printing of blue ink onto the can body outer surface, varnish application, and baking was cut open and the can body part was expanded flat to be turned to a test specimen. The obtained test specimen was set on a DuPont impact tester in such a manner that the sidewall inner surface side was oriented upward and an impact punch would hit the can height position part at 90 mm from the can bottom part. The impact punch had a weight of 300 g and the diameter of its tip sphere was 3/8 inches. The impact punch was so processed that it was dropped from a height of 50 mm and the metal can outer surface side would become convex.

Operation of sticking a cellophane tape (made by Nichiban Co., Ltd.) to the can outer surface side after the processing and peeling off the tape was carried out twice. This measurement was performed at two places for each can. The evaluation was made as follows on the basis of the total area of separation of the blue ink at the convex parts at the two places.

A: The separation area was smaller than 20% and practical use was possible.
B: The separation area was equal to or larger than 20% and smaller than 40% and practical use was possible.
C: The separation area was equal to or larger than 40% and practical use was impossible.

(Evaluation of Appearance of can Body Sidewall Part)

As evaluation of the appearance of the can body sidewall part, after retort sterilization to be described later was performed after the can body forming, the metal color of the underlying metal was rated as follows by visual observation.

A: The appearance was favorable without a change with respect to the underlying metal color and practical use was possible.
B: A haze was slightly caused in the film and the underlying metal color was somewhat difficult to see, but practical use was possible.
C: A haze was caused in the film and the underlying metal color was difficult to see, so that practical use was impossible.

(Evaluation of Retort Blushing)

The above-described seamless two-piece metal can was filled with 340 ml of water and the above-described can lid was seamed. Furthermore, retort sterilization treatment was performed and whether retort blushing (white spots) of the can bottom and the can lid occurred was evaluated as follows by visual observation.

A: Retort blushing (white spots) did not occur in the polyester-based resin composition and practical use was possible.
B: Retort blushing (white spots) slightly occurred partly in the polyester-based resin composition but practical use was possible.
C: Retort blushing (white spots) occurred in the polyester-based resin composition and practical use was impossible.
D: The whole surface of the polyester-based resin composition became cloudy white due to crystallization of the resin and practical use was impossible.

Here, the retort sterilization treatment was performed in the following manner.

First, the above-described seamless two-piece metal cans were filled with 340 ml of water and the above-described can lids were seamed to hermetically seal the cans to make filled pack cans.

Next, the obtained filled pack cans were disposed in a retort oven both in the normal upright state (the side of the seamed can lid part was the upper side) and in the inverted state (the side of the can body bottom part was the upper side) so that both surfaces of the can lid part and the can body bottom part could be evaluated, and pressure heat sterilization treatment at 125° C. for 30 minutes was performed by steam in the hermetically-sealed retort oven.

The filled pack cans in the retort oven were taken out after the above-described pressure heat sterilization treatment and were immersed in water to be cooled to room temperature. Then, whether retort blushing occurred was evaluated by visual observation on both surfaces of the can lid part and the can body bottom part.

(Comprehensive Evaluation)

Applicability as a metal can and a can lid for beverages and foods was comprehensively evaluated as follows from various can characteristics.

A: Application as a metal can and a can lid for beverages and foods was possible.
B: Application as a metal can and a can lid for beverages and foods was impossible.

The measurement results of the film properties (film thickness and recrystallization peak) of an unstretched film using the polyester-based resin composition of working example 1 are shown in Table 1. Furthermore, in Table 1, the kneading conditions such as the kneading temperature (° C.), the Q/N ratio, and the residence time (minutes) are shown. In addition, the degree of kneading is indicated by "high, normal, or low" as a relative index from two conditions of the Q/N ratio and the residence time (minutes). The case in which the Q/N ratio is low and the residence time (minutes) is long is defined as the case in which the degree of kneading is high.

The evaluation results of hairs of the film and the cut state of the film at the time of blanking and can body trimming, abrasion of the can body, delamination at the flange-processed part, ink adhesiveness, appearance of the can body sidewall part, and retort blushing, and the comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

The mixing amount of PBT resin of the polyester (II) was 30 wt %, and the kneading temperature was low and the degree of kneading was normal. Thus, the transesterification reaction was suppressed and the height H of the recrystallization peak was 1.30 mW, so that retort blushing was not observed. In addition, hairs at the time of blanking and can body trimming were not generated, and the cut state of the film was also favorable and the abrasion at the time of metal can conveyance was also not seen.

Furthermore, the ink adhesiveness was also favorable.

Comparative Example 1

The copolymerized polyester (I) in which 15 mol % of the polyester component was isophthalic acid was used as the polyethylene terephthalate-based resin and 10 wt % of the crystalline polyester (II) was mixed.

In the same manner as working example 1 except for that, an organic-resin-coated metal sheet was manufactured, and the recrystallization peak was measured. In addition, a seamless two-piece metal can and a can lid were manufactured, and hairs of the film and the cut state of the film at the time of blanking and can body trimming, abrasion of the can body, delamination at the flange-processed part, ink adhesiveness, appearance of the can body sidewall part, and whether retort blushing occurred were observed.

Measurement results of film properties (film thickness and recrystallization peak) of an unstretched film using the polyester-based resin composition of comparative example 1 are shown in Table 1.

Evaluation results of hairs of the film and the cut state of the film at the time of blanking and can body trimming, abrasion of the can body, delamination at the flange-processed part, ink adhesiveness, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

However, the height H of the recrystallization peak was 0.20 mW. Due to the small mixing amount of PBT resin of the crystalline polyester (II), the transesterification reaction of PBT as a crystalline resin and PET proceeded and the generation rate of crystal nuclei of PBT was low. Thus, retort blushing was observed.

Although hairs at the time of blanking and can body trimming were slightly generated, the cut state of the film was favorable.

Although the mixing ratio of the crystalline polyester (II) was 10 wt % and the abrasion at the time of can conveyance occurred, the ink adhesiveness was favorable.

Working Example 2

As the polyester-based resin composition, the crystalline polyester (II) whose intrinsic viscosity (IV) was 0.69 was used and 20 wt % of the crystalline polyester (II) was mixed.

Furthermore, kneading was performed at the low degree of kneading, with Q/N being 1.6 and the residence time in the extruder being five minutes.

In the same manner as comparative example 1 except for that, an organic-resin-coated metal sheet was manufactured, and the recrystallization peak was measured. In addition, a seamless two-piece metal can and a can lid were manufactured, and hairs of the film and the cut state of the film at the time of blanking and can body trimming, abrasion of the can body, delamination at the flange-processed part, appearance of the can body sidewall part, and whether retort blushing occurred were observed.

Measurement results of film properties (film thickness and recrystallization peak) of an unstretched film using the polyester-based resin composition of working example 2 are shown in Table 1.

Evaluation results of hairs of the film and the cut state of the film at the time of blanking and can body trimming, abrasion of the can body, delamination at the flange-processed part, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Although the degree of kneading was low, the resins were uniformly mixed. Thus, the number of recrystallization peaks was one and the delamination at the flange-processed part did not occur.

The mixing amount of PBT resin of the crystalline polyester (II) was 20 wt % and both the kneading temperature and the degree of kneading were low. Thus, the transesterification reaction was suppressed and the height H of the recrystallization peak was 1.08 mW, so that retort blushing was not observed. In addition, hairs at the time of blanking and can body trimming were not generated and the cut state of the film was also favorable.

Because the intrinsic viscosity (IV) of the crystalline polyester (II) was 0.69, the abrasion at the time of can conveyance slightly occurred.

Working Example 3

An organic-resin-coated metal sheet was manufactured in the same manner as working example 2 except for that the crystalline polyester (II) whose intrinsic viscosity (IV) was 0.87 was used as the polyester-based resin composition, and the recrystallization peak was measured. In addition, a seamless two-piece metal can and a can lid were manufactured, and hairs of the film and the cut state of the film at the time of blanking and can body trimming, abrasion of the can body, delamination at the flange-processed part, appearance of the can body sidewall part, and whether retort blushing occurred were observed.

Measurement results of film properties (film thickness and recrystallization peak) of an unstretched film using the polyester-based resin composition of working example 3 are shown in Table 1.

Evaluation results of hairs of the film and the cut state of the film at the time of blanking and can body trimming, abrasion of the can body, delamination at the flange-processed part, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Although the degree of kneading was low, the resins were uniformly mixed. Thus, the number of recrystallization peaks was one and the delamination at the flange-processed part did not occur.

The mixing amount of PBT resin of the crystalline polyester (II) was 20 wt % and both the kneading temperature and the degree of kneading were low. Thus, the transesterification reaction was suppressed and the height H of the recrystallization peak was 1.08 mW, so that retort blushing was not seen. In addition, hairs at the time of blanking and can body trimming were not generated and the cut state of the film was also favorable.

Because the intrinsic viscosity (IV) of the crystalline polyester (II) was 0.87, the abrasion at the time of can conveyance slightly occurred.

Working Example 4

An organic-resin-coated metal sheet was manufactured in the same manner as working example 2 except for that the crystalline polyester (II) whose intrinsic viscosity (IV) was 1.17 was used as the polyester-based resin composition, and the recrystallization peak was measured. In addition, a seamless two-piece metal can and a can lid were manufactured, and hairs of the film and the cut state of the film at the time of blanking and can body trimming, abrasion of the can body, delamination at the flange-processed part, ink adhesiveness, appearance of the can body sidewall part, and whether retort blushing occurred were observed.

Measurement results of film properties (film thickness and recrystallization peak) of an unstretched film using the polyester-based resin composition of working example 4 are shown in Table 1.

Evaluation results of hairs of the film and the cut state of the film at the time of blanking and can body trimming, abrasion of the can body, delamination at the flange-processed part, ink adhesiveness, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Although the degree of kneading was low, the resins were uniformly mixed. Thus, the number of recrystallization peaks was one and the delamination at the flange-processed part did not occur.

The mixing amount of PBT resin of the crystalline polyester (II) was 20 wt % and both the kneading temperature and the degree of kneading were low. Thus, the transesterification reaction was suppressed and the height H of the recrystallization peak was 1.14 mW, so that retort blushing was not observed. In addition, hairs at the time of blanking and can body trimming were not generated, and the cut state of the film was also favorable and the abrasion at the time of can conveyance was also not seen.

Furthermore, the ink adhesiveness was also favorable.

Working Example 5

An organic-resin-coated metal sheet was manufactured in the same manner as working example 4 except for that the kneading temperature of the polyester-based resin composition was set to 270° C. and kneading was performed under conditions of the normal degree of kneading in which Q/N was 1.0 and the residence time in the extruder was 20 minutes, and the recrystallization peak was measured. In addition, a seamless two-piece metal can and a can lid were manufactured, and hairs of the film and the cut state of the film at the time of blanking, delamination at the flange-processed part, appearance of the can body sidewall part, and whether retort blushing occurred were observed.

Figure 2:
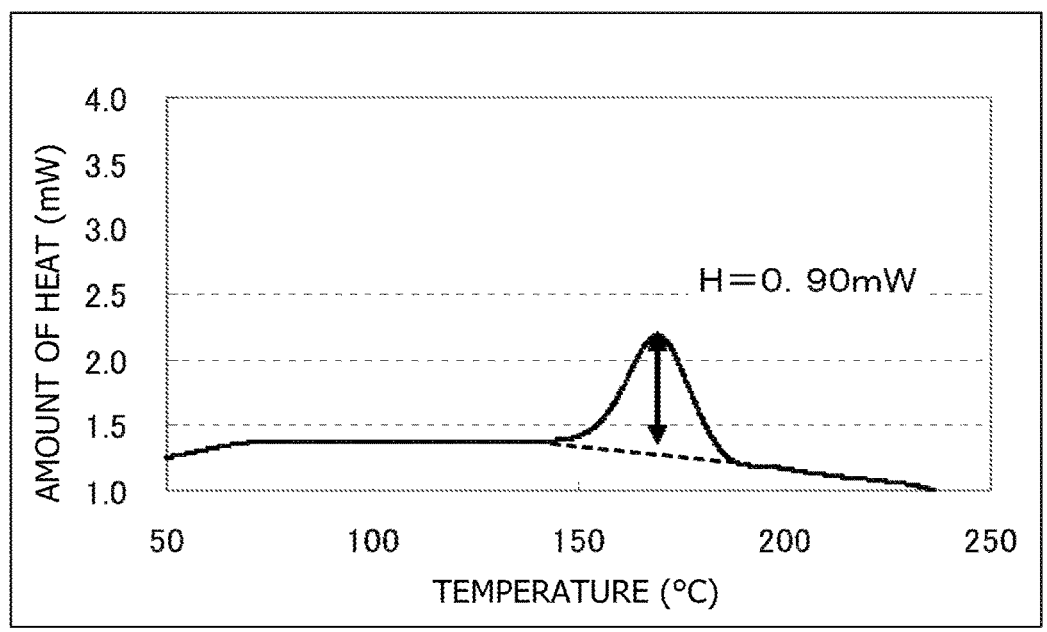
FIG. 2 shows a DSC curve of a polyester-based resin composition used in working example 5 (example in which 0.8 mW≤H≤2.0 mW is satisfied, a transesterification reaction is suppressed and retort blushing does not occur).

Measurement results of film properties (film thickness and recrystallization peak) of an unstretched film using the polyester-based resin composition of working example 5 are shown in Table 1 and FIG. 2.

Evaluation results of hairs of the film and the cut state of the film at the time of blanking, delamination at the flange-processed part, appearance of the can body sidewall part, and retort blushing, and comprehensive evaluation are shown in Table 2.

As shown in Tables 1 and 2, and FIG. 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

The mixing amount of PBT resin of the crystalline polyester (II) was 20 wt % and both the kneading temperature and the degree of kneading were normal. Thus, the transesterification reaction was suppressed and the height H of the recrystallization peak was 0.90 mW, so that retort blushing was not observed. In addition, hairs at the time of blanking were not generated and the cut state of the film was also favorable.

Comparative Example 2

An organic-resin-coated metal sheet was manufactured in the same manner as working example 5 except for that the kneading temperature of the polyester-based resin composition was set to 295° C., and the recrystallization peak was measured.

In addition, a seamless two-piece metal can and a can lid were manufactured, and hairs of the film and the cut state of the film at the time of blanking, delamination at the flange-processed part, appearance of the can body sidewall part, and whether retort blushing occurred were observed.

Measurement results of film properties (film thickness and recrystallization peak) of an unstretched film using the polyester-based resin composition of comparative example 2 are shown in Table 1.

Evaluation results of hairs of the film and the cut state of the film at the time of blanking, delamination at the flange-processed part, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

However, the transesterification reaction proceeded and the height H of the recrystallization peak was 0.50 mW because the kneading temperature was high. Thus, retort blushing was observed and hairs at the time of blanking were also slightly generated.

Working Example 6

An organic-resin-coated metal sheet was manufactured in the same manner as working example 2 except for that the crystalline polyester (II) whose intrinsic viscosity (IV) was 1.30 was used as the polyester-based resin composition, and the recrystallization peak was measured. In addition, a seamless two-piece metal can and a can lid were manufactured, and hairs of the film and the cut state of the film at the time of blanking, delamination at the flange-processed part, appearance of the can body sidewall part, and whether retort blushing occurred were observed.

Measurement results of film properties (film thickness and recrystallization peak) of an unstretched film using the polyester-based resin composition of working example 6 are shown in Table 1.

Evaluation results of hairs of the film and the cut state of the film at the time of blanking, delamination at the flange-processed part, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Although the degree of kneading was low, the resins were uniformly mixed. Thus, the number of recrystallization peaks was one and the delamination at the flange-processed part did not occur.

The mixing amount of PBT resin of the crystalline polyester (II) was 20 wt % and both the kneading temperature and the degree of kneading were low. Thus, the transesterification reaction was suppressed and the height H of the recrystallization peak was 1.10 mW, so that retort blushing was not observed. In addition, hairs at the time of blanking were not generated and the cut state of the film was also favorable.

Working Example 7

An organic-resin-coated metal sheet was manufactured in the same manner as working example 4 except for that 30 wt % of the crystalline polyester (II) was mixed as the polyester-based resin composition and the polyester-based resin composition was kneaded under conditions of the normal degree of kneading in which Q/N was 1.0 and the residence time in the extruder was 20 minutes, and the recrystallization peak was measured. In addition, a seamless two-piece metal can and a can lid were manufactured, and hairs of the film and the cut state of the film at the time of blanking and can body trimming, abrasion of the can body, delamination at the flange-processed part, ink adhesiveness, appearance of the can body sidewall part, and whether retort blushing occurred were observed.

Measurement results of film properties (film thickness and recrystallization peak) of an unstretched film using the polyester-based resin composition of working example 7 are shown in Table 1.

Evaluation results of hairs of the film and the cut state of the film at the time of blanking and can body trimming, abrasion of the can body, delamination at the flange-processed part, ink adhesiveness, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

Furthermore, the mixing amount of PBT resin of the crystalline polyester (II) was 30 wt %, and the kneading temperature was low and the degree of kneading was normal. Thus, the transesterification reaction was suppressed and the height H of the recrystallization peak was 1.10 mW, so that retort blushing was not observed. In addition, hairs at the time of blanking and can body trimming were not generated, and the cut state of the film was also favorable and the abrasion at the time of can conveyance was also not seen.

Furthermore, the ink adhesiveness was also favorable.

Working Example 8

An organic-resin-coated metal sheet was manufactured in the same manner as working example 7 except for that the kneading temperature of the polyester-based resin composition was set to 270° C., and the recrystallization peak was measured. In addition, a seamless two-piece metal can and a can lid were manufactured, and hairs of the film and the cut state of the film at the time of blanking and can body trimming, abrasion of the can body, delamination at the flange-processed part, ink adhesiveness, appearance of the can body sidewall part, and whether retort blushing occurred were observed.

Measurement results of film properties (film thickness and recrystallization peak) of an unstretched film using the polyester-based resin composition of working example 8 are shown in Table 1.

Evaluation results of hairs of the film and the cut state of the film at the time of blanking and can body trimming, abrasion of the can body, delamination at the flange-processed part, ink adhesiveness, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

The mixing amount of PBT resin of the crystalline polyester (II) was 30 wt % and both the kneading temperature and the degree of kneading were normal. Thus, the transesterification reaction was suppressed and the height H of the recrystallization peak was 1.00 mW, so that retort blushing was not observed. In addition, hairs at the time of blanking and can body trimming were not generated, and the cut state of the film was also favorable and the abrasion at the time of can conveyance was also not seen.

Furthermore, the ink adhesiveness was also favorable.

Comparative Example 4

An organic-resin-coated metal sheet was manufactured in the same manner as working example 8 except for that the polyester-based resin composition was kneaded under conditions of the high degree of kneading in which Q/N was 0.8 and the residence time in the extruder was 20 minutes, and the recrystallization peak was measured. In addition, a seamless two-piece metal can and a can lid were manufactured, and hairs of the film and the cut state of the film at the time of blanking, delamination at the flange-processed part, appearance of the can body sidewall part, and whether retort blushing occurred were observed.

Measurement results of film properties (film thickness and recrystallization peak) of an unstretched film using the polyester-based resin composition of comparative example 4 are shown in Table 1.

Evaluation results of hairs of the film and the cut state of the film at the time of blanking, delamination at the flange-processed part, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was high and the resins were uniformly mixed, the number of recrystallization peaks was one and the delamination at the flange-processed part did not occur.

However, the transesterification reaction proceeded and the height H of the recrystallization peak was 0.70 mW because the degree of kneading was high. Thus, retort blushing was observed and hairs at the time of blanking were also slightly generated.

Comparative Example 5

An organic-resin-coated metal sheet was manufactured in the same manner as working example 8 except for that the kneading temperature of the polyester-based resin composition was set to 295° C., and the recrystallization peak was measured. In addition, a seamless two-piece metal can and a can lid were manufactured, and hairs of the film and the cut state of the film at the time of blanking, delamination at the flange-processed part, appearance of the can body sidewall part, and whether retort blushing occurred were observed.

Figure 3:
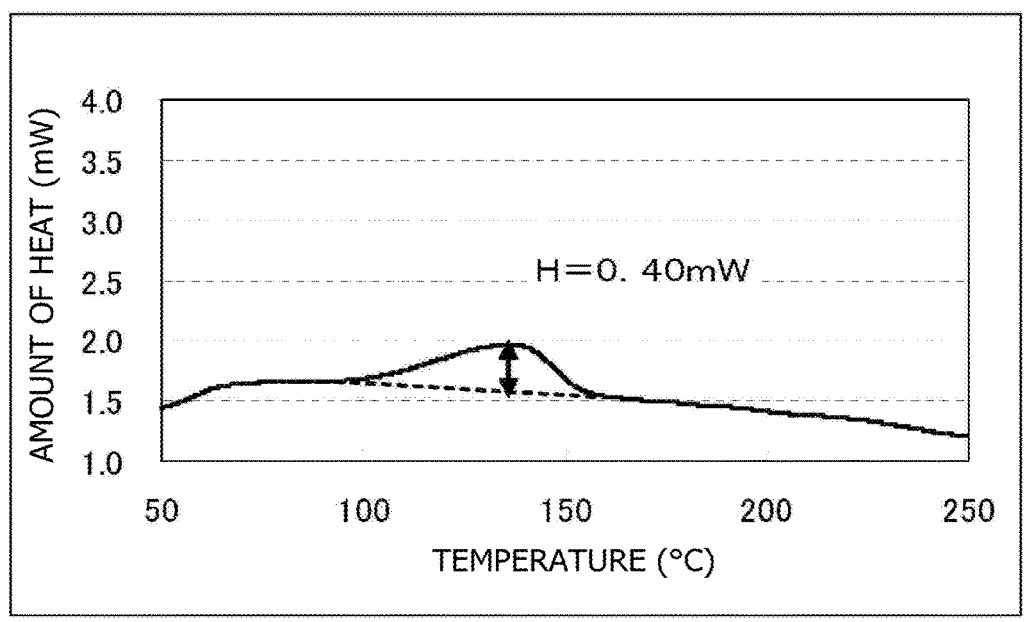
FIG. 3 shows a DSC curve of a polyester-based resin composition used in comparative example 5 (example in which H<0.8 mW is satisfied, a transesterification reaction proceeds and retort blushing occurs).

Measurement results of film properties (film thickness and recrystallization peak) of an unstretched film using the polyester-based resin composition of comparative example 5 are shown in Table 1 and FIG. 3.

Evaluation results of hairs of the film and the cut state of the film at the time of blanking, delamination at the flange-processed part, appearance of the can body sidewall part, and retort blushing, and comprehensive evaluation are shown in Table 2.

As shown in Tables 1 and 2 and FIG. 3, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

However, the transesterification reaction proceeded and the height H of the recrystallization peak was 0.40 mW because the kneading temperature was as high as 295° C. Thus, retort blushing was observed and hairs at the time of blanking were also slightly generated.

Working Example 9

An organic-resin-coated metal sheet was manufactured in the same manner as working example 8 except for that the polyester (II) whose intrinsic viscosity (IV) was 1.30 was used as the polyester-based resin composition, and the recrystallization peak was measured. In addition, a seamless two-piece metal can and a can lid were manufactured, and hairs of the film and the cut state of the film at the time of blanking and can body trimming, abrasion of the can body, delamination at the flange-processed part, ink adhesiveness, appearance of the can body sidewall part, and whether retort blushing occurred were observed.

Measurement results of film properties (film thickness and recrystallization peak) of an unstretched film using the polyester-based resin composition of working example 9 are shown in Table 1.

Evaluation results of hairs of the film and the cut state of the film at the time of blanking and can body trimming, abrasion of the can body, delamination at the flange-processed part, ink adhesiveness, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

The mixing amount of PBT resin of the crystalline polyester (II) was 30 wt % and both the kneading temperature and the degree of kneading were normal. Thus, the transesterification reaction was suppressed and the height H of the recrystallization peak was 0.80 mW, so that retort blushing was not observed. In addition, hairs at the time of blanking and can body trimming were not generated, and the cut state of the film was also favorable and the abrasion at the time of can conveyance was also not seen.

Furthermore, the ink adhesiveness was also favorable.

Working Example 10

An organic-resin-coated metal sheet was manufactured in the same manner as working example 4 except for that 40 wt % of the crystalline polyester (II) was mixed as the polyester-based resin composition and the polyester-based resin composition was kneaded under conditions of the normal degree of kneading in which Q/N was 1.0 and the residence time in the extruder was 20 minutes, and the recrystallization peak was measured. In addition, a seamless two-piece metal can and a can lid were manufactured, and hairs of the film and the cut state of the film at the time of blanking and can body trimming, abrasion of the can body, delamination at the flange-processed part, ink adhesiveness, appearance of the can body sidewall part, and whether retort blushing occurred were observed.

Measurement results of film properties (film thickness and recrystallization peak) of an unstretched film using the polyester-based resin composition of working example 10 are shown in Table 1.

Evaluation results of hairs of the film and the cut state of the film at the time of blanking and can body trimming, abrasion of the can body, delamination at the flange-processed part, ink adhesiveness, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

The mixing amount of PBT resin of the crystalline polyester (II) was 40 wt %, and the kneading temperature was low and the degree of kneading was normal. Thus, the transesterification reaction was suppressed and the height H of the recrystallization peak was 1.20 mW, so that retort blushing was not observed. In addition, hairs at the time of blanking and can body trimming were not generated, and the cut state of the film was also favorable and the abrasion at the time of can conveyance was also not seen.

Furthermore, the ink adhesiveness was also favorable.

Working Example 11

An organic-resin-coated metal sheet was manufactured in the same manner as working example 10 except for that the kneading temperature of the polyester-based resin composition was set to 270° C., and the recrystallization peak was measured. In addition, a seamless two-piece metal can and a can lid were manufactured, and hairs of the film and the cut state of the film at the time of blanking, delamination at the flange-processed part, appearance of the can body sidewall part, and whether retort blushing occurred were observed.

Measurement results of film properties (film thickness and recrystallization peak) of an unstretched film using the polyester-based resin composition of working example 11 are shown in Table 1.

Evaluation results of hairs of the film and the cut state of the film at the time of blanking, delamination at the flange-processed part, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

The mixing amount of PBT resin of the crystalline polyester (II) was 40 wt % and both the kneading temperature and the degree of kneading were normal. Thus, the transesterification reaction was suppressed and the height H of the recrystallization peak was 1.30 mW, so that retort blushing was not observed. In addition, hairs at the time of blanking were not generated and the cut state of the film was also favorable.

Working Example 12

An organic-resin-coated metal sheet was manufactured in the same manner as working example 11 except for that the kneading temperature of the polyester-based resin composition was set to 285° C., and the recrystallization peak was measured. In addition, a seamless two-piece metal can and a can lid were manufactured, and hairs of the film and the cut state of the film at the time of blanking and can body trimming, abrasion of the can body, delamination at the flange-processed part, ink adhesiveness, appearance of the can body sidewall part, and whether retort blushing occurred were observed.

Measurement results of film properties (film thickness and recrystallization peak) of an unstretched film using the polyester-based resin composition of working example 12 are shown in Table 1.

Evaluation results of hairs of the film and the cut state of the film at the time of blanking and can body trimming, abrasion of the can body, delamination at the flange-processed part, ink adhesiveness, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

The mixing amount of PBT resin of the crystalline polyester (II) was 40 wt %, and the kneading temperature was 285° C. and the degree of kneading was normal. Thus, the transesterification reaction was suppressed and the height H of the recrystallization peak was 0.85 mW, so that retort blushing was not observed. In addition, hairs at the time of blanking and can body trimming were not generated, and the cut state of the film was also favorable and the abrasion at the time of can conveyance was also not seen.

Furthermore, the ink adhesiveness was also favorable.

Working Example 13

An organic-resin-coated metal sheet was manufactured in the same manner as working example 11 except for that 45 wt % of the crystalline polyester (II) was mixed as the polyester-based resin composition, and the recrystallization peak was measured. In addition, a seamless two-piece metal can and a can lid were manufactured, and hairs of the film and the cut state of the film at the time of blanking and can body trimming, delamination at the flange-processed part, appearance of the can body sidewall part, and whether retort blushing occurred were observed.

Measurement results of film properties (film thickness and recrystallization peak) of an unstretched film using the polyester-based resin composition of working example 13 are shown in Table 1.

Evaluation results of hairs of the film and the cut state of the film at the time of blanking and can body trimming, delamination at the flange-processed part, appearance of the can body sidewall part, and retort blushing, and comprehensive evaluation are shown in Table 2.

As shown in Tables 1 and 2, the appearance of the sidewall part of the can body outer surface was favorable without a change with respect to the metal color of the underlying metal.

Because the degree of kneading was normal and the resins were uniformly mixed, the number of recrystallization peaks was one and the delamination at the flange-processed part did not occur.

The mixing amount of PBT resin of the crystalline polyester (II) was 45 wt % and both the kneading temperature and the degree of kneading were normal. Thus, the transesterification reaction was suppressed and the height H of the recrystallization peak was 1.05 mW, so that retort blushing was not observed. In addition, hairs at the time of blanking and can body trimming were not generated and the cut state of the film was also favorable.

Comparative Example 7

An organic-resin-coated metal sheet was manufactured in the same manner as working example 10 except for that 50 wt % of the crystalline polyester (II) was mixed as the polyester-based resin composition, and the recrystallization peak was measured. In addition, a seamless two-piece metal can and a can lid were manufactured, and hairs of the film and the cut state of the film at the time of blanking and can body trimming, delamination at the flange-processed part, appearance of the can body sidewall part, and whether retort blushing occurred were observed.

Measurement results of film properties (film thickness and recrystallization peak) of an unstretched film using the polyester-based resin composition of comparative example 7 are shown in Table 1.

Evaluation results of hairs of the film and the cut state of the film at the time of blanking and can body trimming, delamination at the flange-processed part, appearance of the can body sidewall part, and retort blushing, and comprehensive evaluation are shown in Table 2.

As shown in Tables 1 and 2, in the appearance of the sidewall part of the can body outer surface, a haze was slightly caused in the film and the metal color deteriorated because the crystallization rate of the PBT resin of the crystalline polyester (II) was high.

Because the degree of kneading was normal and the resins were uniformly mixed, the number of recrystallization peaks was one. However, because the mixing amount of PBT resin of the crystalline polyester (II) was too large, the adhesiveness lowered and the delamination at the flange-processed part slightly occurred.

Furthermore, the height H of the recrystallization peak was 2.00 mW because the mixing amount of PBT resin of the crystalline polyester (II) was 50 wt %. However, the crystallization rate of PBT as a crystalline resin was too high and thus crystal nuclei became coarse crystal grains, so that cloudy whitening of the whole surface of the film occurred.

Hairs at the time of blanking were not generated and the cut state of the film was also favorable. However, hairs were slightly generated at the time of can body trimming.

Comparative Example 8

An organic-resin-coated metal sheet was manufactured in the same manner as working example 10 except for that 60 wt % of the crystalline polyester (II) was mixed as the polyester-based resin composition, and the recrystallization peak was measured. In addition, a seamless two-piece metal can and a can lid were manufactured, and hairs of the film and the cut state of the film at the time of blanking and can body trimming, delamination at the flange-processed part, appearance of the can body sidewall part, and whether retort blushing occurred were observed.

Figure 4:
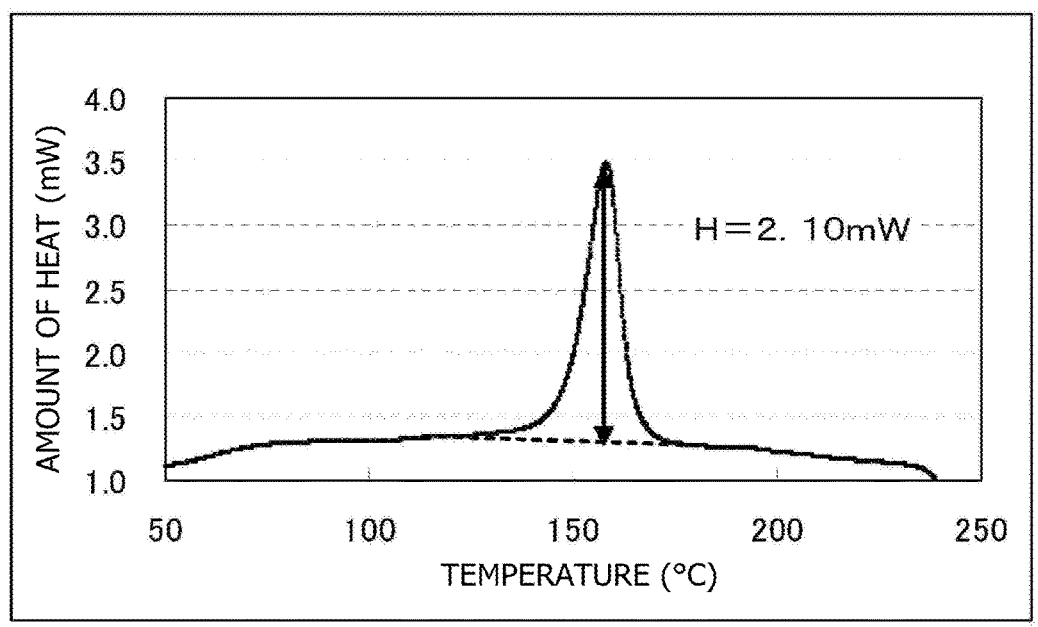
FIG. 4 shows a DSC curve of a polyester-based resin composition used in comparative example 8 (example in which 2.0 mW<H is satisfied, retort blushing does not occur but the whole surface of the polyester-based resin composition becomes cloudy white due to crystallization of the resin).

Measurement results of film properties (film thickness and recrystallization peak) of an unstretched film using the polyester-based resin composition of comparative example 8 are shown in Table 1 and FIG. 4.

Evaluation results of hairs of the film and the cut state of the film at the time of blanking and can body trimming, delamination at the flange-processed part, appearance of the can body sidewall part, and retort blushing, and comprehensive evaluation are shown in Table 2.

As shown in Tables 1 and 2 and FIG. 4, in the appearance of the sidewall part of the can body outer surface, a haze was slightly caused in the film and the metal color deteriorated because the crystallization rate of the PBT resin of the polyester (II) was high.

Because the degree of kneading was normal and the resins were uniformly mixed, the number of recrystallization peaks was one. However, because the mixing amount of PBT resin of the crystalline polyester (II) was too large, the adhesiveness lowered and obvious delamination occurred at the flange-processed part.

Furthermore, the height H of the recrystallization peak was 2.10 mW because the mixing amount of PBT resin of the crystalline polyester (II) was 60 wt %. However, the crystallization rate of PBT as a crystalline resin was too high and thus crystal nuclei became coarse crystal grains, so that cloudy whitening of the whole surface of the film occurred.

Slight hairs were generated at the time of blanking and hairs were generated at the time of can body trimming. In addition, a part at which the film was not cut and the trim-target part adhered to the can body was present.

Comparative Example 9

An organic-resin-coated metal sheet was manufactured in the same manner as working example 10 except for that 70 wt % of the crystalline polyester (II) was mixed as the polyester-based resin composition, and the recrystallization peak was measured. In addition, a seamless two-piece metal can and a can lid were manufactured, and hairs of the film and the cut state of the film at the time of blanking and can body trimming, delamination at the flange-processed part, appearance of the can body sidewall part, and whether retort blushing occurred were observed.

Measurement results of film properties (film thickness and recrystallization peak) of an unstretched film using the polyester-based resin composition of comparative example 9 are shown in Table 1.

Evaluation results of hairs of the film and the cut state of the film at the time of blanking and can body trimming, delamination at the flange-processed part, appearance of the can body sidewall part, and retort blushing, and comprehensive evaluation are shown in Table 2.

As shown in Tables 1 and 2, in the appearance of the sidewall part of the can body outer surface, a haze was slightly caused in the film and the metal color deteriorated because the crystallization rate of the PBT resin of the polyester (II) was high.

Because the degree of kneading was normal and the resins were uniformly mixed, the number of recrystallization peaks was one. However, because the mixing amount of PBT resin of the crystalline polyester (II) was too large, the adhesiveness lowered and obvious delamination occurred at the flange-processed part.

Furthermore, the height H of the recrystallization peak was 2.70 mW because the mixing amount of PBT resin of the crystalline polyester (II) was 70 wt %. However, the crystallization rate of PBT as a crystalline resin was too high and thus crystal nuclei became coarse crystal grains, so that cloudy whitening of the whole surface of the film occurred.

Hairs were generated at the time of blanking and can body trimming. In addition, a part at which the film was not cut and the trim-target part adhered to the can body was present.

Comparative Example 10

An organic-resin-coated metal sheet was manufactured in the same manner as working example 10 except for that 80 wt % of the crystalline polyester (II) was mixed as the polyester-based resin composition, and the recrystallization peak was measured. In addition, a seamless two-piece metal can and a can lid were manufactured, and hairs of the film and the cut state of the film at the time of blanking and can body trimming, delamination at the flange-processed part, ink adhesiveness, appearance of the can body sidewall part, and whether retort blushing occurred were observed.

Measurement results of film properties (film thickness and recrystallization peak) of an unstretched film using the polyester-based resin composition of comparative example 10 are shown in Table 1.

Evaluation results of hairs of the film and the cut state of the film at the time of blanking and can body trimming, delamination at the flange-processed part, ink adhesiveness, appearance of the can body sidewall part, and retort blushing, and comprehensive evaluation are shown in Table 2.

As shown in Tables 1 and 2, in the appearance of the sidewall part of the can body outer surface, a haze was slightly caused in the film and the metal color deteriorated because the crystallization rate of the PBT resin of the polyester (II) was high.

Because the degree of kneading was normal and the resins were uniformly mixed, the number of recrystallization peaks was one. However, because the mixing amount of PBT resin of the crystalline polyester (II) was too large, the adhesiveness lowered and obvious delamination occurred at the flange-processed part.

Furthermore, the height H of the recrystallization peak was 3.20 mW because the mixing amount of PBT resin of the crystalline polyester (II) was 80 wt %. However, the crystallization rate of PBT as a crystalline resin was too high and thus crystal nuclei became coarse crystal grains, so that cloudy whitening of the whole surface of the film occurred.

Hairs were generated at the time of blanking and can body trimming. In addition, a part at which the film was not cut and the trim-target part adhered to the can body was present.

Working Examples 14 to 41 and Comparative Examples 11 to 25

In working examples 14 to 41 and comparative examples 11 to 25, organic-resin-coated metal sheets were manufactured in the same manner as working example 11 except for that the organic-resin-coated metal sheets were subjected to heat treatment under heat treatment conditions (temperature and time) shown in Table 3, and the recrystallization peak was measured. In addition, can lids were manufactured and whether retort blushing occurred was observed.

Figure 5:
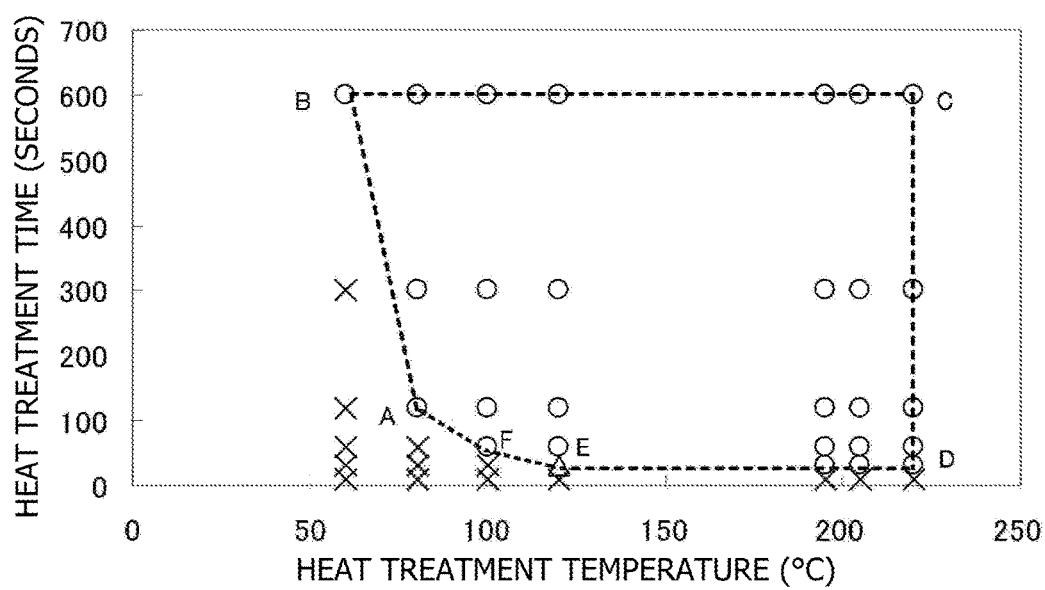
FIG. 5 is a graph showing the relationship between the heat treatment temperature and the time regarding the occurrence of retort blushing of an organic-resin-coated metal sheet, a metal can, and a can lid.

Measurement results of film properties (film thickness and recrystallization peak) of an unstretched film using the polyester-based resin compositions of working examples 14 to 41 and comparative examples 11 to 25 and the evaluation results of retort blushing are shown in Table 3 and FIG. 5.

As shown in Table 3 and FIG. 5, in working examples 14 to 41, the heat treatment was so performed that the relationship between the temperature and the time of the heat treatment fell within the range of the region formed by sequentially linking A (80° C., 120 seconds), B (60° C., 600 seconds), C (220° C., 600 seconds), D (220° C., 30 seconds), E (120° C., 30 seconds), F (100° C., 60 seconds), and A (80° C., 120 seconds) in FIG. 5 by straight lines. Due to this, retort blushing (white spots) did not occur or the degree of occurrence was within the range in which practical use was possible even when retort blushing (white spots) slightly occurred partly.

In comparative examples 11 to 25, the heat treatment was performed outside the region formed by sequentially linking A (80° C., 120 seconds), B (60° C., 600 seconds), C (220° C., 600 seconds), D (220° C., 30 seconds), E (120° C., 30 seconds), F (100° C., 60 seconds), and A (80° C., 120 seconds) in FIG. 6 by straight lines, and retort blushing (white spots) occurred.

Note that "↑" in Tables indicates that data corresponding to this "↑" is the same as the data described above.

TABLE 1

| | Polyester (I) | | | | | Polyester (II) | | | | Kneading Conditions | | | | Film Properties | | | |
|---|---|---|---|---|---|---|---|---|---|---|---|---|---|---|---|---|---|
| | PET | | | | | PBT | | | | | | | | | Recrystallization Peak | | |
| | Copolymerized Component | | | | | Component | | | | Kneading Temperature (° C.) | Degree of Kneading | Q/N | Residence Time (minute) | Film Thickness (μm) | Number of Peaks | Tc (° C.) | H (mW) |
| | Component | Mol % | IV | Tm (° C.) | Amount (wt %) | Component | IV | Tm (° C.) | Amount (wt %) | | | | | | | | |
| Working Example 1 | IA | 12 | 0.9 | 215 | 70 | PBT | 1.17 | 220 | 30 | 255 | Normal | 1.0 | 20 | 10 | 1 | 159.3 | 1.30 |
| Comparative Example 1 | IA | 15 | ↑ | 210 | 90 | PBT | 1.17 | ↑ | 10 | 255 | Normal | 1.0 | 20 | 10 | 1 | 135.2 | 0.20 |
| Working Example 2 | IA | 15 | ↑ | ↑ | 80 | PBT | 0.69 | ↑ | 20 | 255 | Low | 1.6 | 5 | 10 | 1 | 170.7 | 1.08 |
| Working Example 3 | IA | 15 | ↑ | ↑ | 80 | PBT | 0.87 | ↑ | 20 | 255 | Low | 1.6 | 5 | 10 | 1 | 167.2 | 1.08 |
| Working Example 4 | IA | 15 | ↑ | ↑ | 80 | PBT | 1.17 | ↑ | 20 | 255 | Low | 1.6 | 20 | 10 | 1 | 168.5 | 1.14 |
| Working Example 5 | IA | 15 | ↑ | ↑ | 80 | PBT | 1.17 | ↑ | 20 | 270 | Normal | 1.0 | 20 | 10 | 1 | 155.4 | 0.90 |
| Comparative Example 2 | IA | 15 | ↑ | ↑ | 80 | PBT | 1.17 | ↑ | 20 | 295 | Normal | 1.0 | 5 | 10 | 1 | 145.2 | 0.50 |
| Working Example 6 | IA | 15 | ↑ | ↑ | 80 | PBT | 1.30 | ↑ | 20 | 255 | Low | 1.6 | 20 | 10 | 1 | 167.2 | 1.10 |
| Working Example 7 | IA | 15 | ↑ | ↑ | 80 | PBT | 1.17 | ↑ | 30 | 255 | Normal | 1.0 | 20 | 10 | 1 | 149.6 | 1.10 |
| Working Example 8 | IA | 15 | ↑ | ↑ | 70 | PBT | 1.17 | ↑ | 30 | 270 | Normal | 1.0 | 20 | 10 | 1 | 165.0 | 1.00 |
| Comparative Example 4 | IA | 15 | ↑ | ↑ | 70 | PBT | 1.17 | ↑ | 30 | 270 | High | 0.8 | 20 | 10 | 1 | 141.3 | 0.70 |
| Comparative Example 5 | IA | 15 | ↑ | ↑ | 70 | PBT | 1.17 | ↑ | 30 | 295 | Normal | 1.0 | 20 | 10 | 1 | 139.9 | 0.40 |
| Working Example 9 | IA | 15 | ↑ | ↑ | 70 | PBT | 1.30 | ↑ | 30 | 270 | Normal | 1.0 | 20 | 10 | 1 | 153.6 | 0.80 |
| Working Example 10 | IA | 15 | ↑ | ↑ | 70 | PBT | 1.17 | ↑ | 40 | 255 | Normal | 1.0 | 20 | 10 | 1 | 167.6 | 1.20 |
| Working Example 11 | IA | 15 | ↑ | ↑ | 60 | PBT | 1.17 | ↑ | 40 | 270 | Normal | 1.0 | 20 | 10 | 1 | 172.5 | 1.30 |
| Working Example 12 | IA | 15 | ↑ | ↑ | 60 | PBT | 1.17 | ↑ | 40 | 285 | Normal | 1.0 | 20 | 10 | 1 | 156.8 | 0.85 |

TABLE 1-continued

| | Polyester (I) | | | | | Polyester (II) | | | | Kneading Conditions | | | | Film Properties | | | |
| | PET | | | | | PBT | | | | | | | | | Recrystallization | | |
| | Copolymerized Component | | | | Mixing | Component | | | Mixing | Kneading Temperature | Degree of Kneading | Q/N | Residence Time | Film Thickness | Peak | | |
| | | | | | | | | | | | | | | | | Number of Peaks | Tc | H |
| | Component | Mol % | IV | Tm (° C.) | Amount (wt %) | Component | IV | Tm (° C.) | Amount (wt %) | (° C.) | | | (minute) | (μm) | | (° C.) | (mW) |
|---|---|---|---|---|---|---|---|---|---|---|---|---|---|---|---|---|---|
| Working Example 13 | IA | 15 | ↑ | ↑ | 60 | PBT | 1.17 | ↑ | 45 | 270 | Normal | 1.0 | 20 | 10 | 1 | 163.2 | 1.05 |
| Comparative Example 7 | IA | 15 | ↑ | ↑ | 50 | PBT | 1.17 | ↑ | 50 | 255 | Normal | 1.0 | 20 | 10 | 1 | 176.4 | 2.00 |
| Comparative Example 8 | IA | 15 | ↑ | ↑ | 40 | PBT | 1.17 | ↑ | 60 | 255 | Normal | 1.0 | 20 | 10 | 1 | 180.8 | 2.10 |
| Comparative Example 9 | IA | 15 | ↑ | ↑ | 30 | PBT | 1.17 | ↑ | 70 | 255 | Normal | 1.0 | 20 | 10 | 1 | 186.3 | 2.70 |
| Comparative Example 10 | IA | 15 | ↑ | ↑ | 20 | PBT | 1.17 | ↑ | 80 | 255 | Normal | 1.0 | 20 | 10 | 1 | 187.8 | 3.20 |

TABLE 2

| | Polyester (I) PET | | | | Polyester (II) | | | | | Can Characteristics | | | | | | | | |
|---|---|---|---|---|---|---|---|---|---|---|---|---|---|---|---|---|---|---|
| | Copolymerized Component | | | | Mixing Amount | PBT Component | | | Mixing Amount | Hairs | | Abrasion Can Body Lower Part | Delamination Flange Part | Ink Adhesiveness Can Body Sidewall Part | Appearance Can Body Sidewall Part | Retort Blushing | | Comprehensive Evaluation |
| | Component | Mol % | IV | Tm (°C) | (wt %) | Component | IV | Tm (°C) | (wt %) | Blanking | Trimming | | | | | Can Lid | Can Body Bottom part | |
| Working Example 1 | IA | 12 | 0.9 | 215 | 70 | PBT | 1.17 | 220 | 30 | A | A | A | A | A | A | A | A | A |
| Comparative Example 1 | IA | 15 | ↑ | 210 | 90 | PBT | 1.17 | ↑ | 10 | B | B | C to B | A | A | A | C (white spots) | C (white spots) | B |
| Working Example 2 | IA | 15 | ↑ | ↑ | 80 | PBT | 0.69 | ↑ | 20 | A | A | B | A | — | A | A | A | A |
| Working Example 3 | IA | 15 | ↑ | ↑ | 80 | PBT | 0.87 | ↑ | 20 | A | A | B | A | A | A | A | A | A |
| Working Example 4 | IA | 15 | ↑ | ↑ | 80 | PBT | 1.17 | ↑ | 20 | A | A | A | A | — | A | A | A | A |
| Working Example 5 | IA | 15 | ↑ | ↑ | 80 | PBT | 1.17 | ↑ | 20 | A | — | — | A | — | A | A | A | A |
| Comparative Example 2 | IA | 15 | ↑ | ↑ | 80 | PBT | 1.17 | ↑ | 20 | B | — | — | A | — | A | C (white spots) | C (white spots) | B |
| Working Example 6 | IA | 15 | ↑ | ↑ | 80 | PBT | 1.30 | ↑ | 20 | A | — | — | A | — | A | A | A | A |
| Working Example 7 | IA | 15 | ↑ | ↑ | 70 | PBT | 1.17 | ↑ | 30 | A | A | A | A | A | A | A | A | A |
| Working Example 8 | IA | 15 | ↑ | ↑ | 70 | PBT | 1.17 | ↑ | 30 | A to B | — | — | A | — | A | A | A | A |
| Comparative Example 4 | IA | 15 | ↑ | ↑ | 70 | PBT | 1.17 | ↑ | 30 | B | — | — | A | — | A | C (white spots) | C (white spots) | B |
| Comparative Example 5 | IA | 15 | ↑ | ↑ | 70 | PBT | 1.17 | ↑ | 30 | A | A | A | A | A | A | C (white spots) | C (white spots) | B |
| Working Example 9 | IA | 15 | ↑ | ↑ | 70 | PBT | 1.30 | ↑ | 30 | A | A | A | A | A | A | A | A | A |
| Working Example 10 | IA | 15 | ↑ | ↑ | 60 | PBT | 1.17 | ↑ | 40 | A | A | A | A | A | A | A | A | A |

TABLE 2-continued

| | Polyester (I) | | | | Polyester (II) | | | | Can Characteristics | | | | | | | |
|---|---|---|---|---|---|---|---|---|---|---|---|---|---|---|---|---|
| | PET | | | | | | | | Hairs | | Abrasion | Delamination | Ink Adhesiveness | Appearance | Petort Blushing | | Comprehensive |
| | Copolymerized Component | Mol % | IV | Tm (° C.) | Mixing Amount (wt %) | Component | PBT Component | IV | Tm (° C.) | Mixing Amount (wt %) | Blanking | Trimming | Can Body Lower Part | Flange Part | Can Body Sidewall Part | Can Body Sidewall Part | Can Lid | Can Body Bottom part | Evaluation |
| Working Example 11 | IA | 15 | ↑ | ↑ | 60 | PBT | 1.17 | ↑ | 40 | A | — | — | A | — | A | A | A | A |
| Working Example 12 | IA | 15 | ↑ | ↑ | 60 | PBT | 1.17 | ↑ | 40 | A | A | A | A | A | A | A | A | A |
| Working Example 13 | IA | 15 | ↑ | ↑ | 55 | PBT | 1.17 | ↑ | 45 | A | A | — | A | — | A | A | A | A |
| Comparative Example 7 | IA | 15 | ↑ | ↑ | 50 | PBT | 1.17 | ↑ | 50 | A | B | — | B | — | B | D (cloudy white) | D (cloudy white) | B |
| Comparative Example 8 | IA | 15 | ↑ | ↑ | 40 | PBT | 1.17 | ↑ | 60 | B | C | — | C | — | B | D (cloudy white) | D (cloudy white) | B |
| Comparative Example 9 | IA | 15 | ↑ | ↑ | 30 | PBT | 1.17 | ↑ | 70 | C | C | — | C | — | B | D (cloudy white) | D (cloudy white) | B |
| Comparative Example 10 | IA | 15 | ↑ | ↑ | 20 | PBT | 1.17 | ↑ | 80 | C | C | — | C | C | B | D (cloudy white) | D (cloudy white) | B |

"—" indicates not measured

TABLE 3

| | Polyester (I) PET | | | | | Polyester (II) PBT | | | | Kneading Conditions | | | | Film Properties | | | | | Heat Treatment Conditions | | Characteristics |
|---|---|---|---|---|---|---|---|---|---|---|---|---|---|---|---|---|---|---|---|---|---|
| | Copolymerized Component | | | | Mixing | Component | | | Mixing | Kneading | Degree of | | Residence | Film | Recrystallization Peak | | | | | | Retort |
| | Component | Mol % | IV | Tm (° C.) | Amount (wt %) | Component | IV | Tm (° C.) | Amount (wt %) | Temperature (° C.) | Kneading | Q/N | Time (minute) | Thickness (um) | Number of Peaks | Tc (° C.) | H (nW) | Temperature (° C.) | Time (second) | Blushing Can Lid |
| Comparative Example 11 | IA | 15 | 0.9 | 210 | 60 | PBT | 1.17 | 220 | 40 | 270 | Normal | 1.0 | 20 | 10 | 1 | 172.5 | 1.30 | — | — | C (white spots) |
| Comparative Example 12 | IA | 15 | ← | ← | 60 | PBT | ← | ← | 40 | 270 | Normal | 1.0 | 20 | 10 | 1 | 172.5 | 1.30 | 60 | 10 | C (white spots) |
| Comparative Example 13 | IA | 15 | ← | ← | 60 | PBT | ← | ← | 40 | 270 | Normal | 1.0 | 20 | 10 | 1 | 172.5 | 1.30 | ← | 30 | C (white spots) |
| Comparative Example 14 | IA | 15 | ← | ← | 60 | PBT | ← | ← | 40 | 270 | Normal | 1.0 | 20 | 10 | 1 | 172.5 | 1.30 | ← | 60 | C (white spots) |
| Comparative Example 15 | IA | 15 | ← | ← | 60 | PBT | ← | ← | 40 | 270 | Normal | 1.0 | 20 | 10 | 1 | 172.5 | 1.30 | ← | 120 | C (white spots) |
| Comparative Example 16 | IA | 15 | ← | ← | 60 | PBT | ← | ← | 40 | 270 | Normal | 1.0 | 20 | 10 | 1 | 172.5 | 1.30 | ← | 300 | C (white spots) |
| Working Example 14 | IA | 15 | ← | ← | 60 | PBT | ← | ← | 40 | 270 | Normal | 1.0 | 20 | 10 | 1 | 172.5 | 1.30 | ← | 600 | A |
| Comparative Example 17 | IA | 15 | ← | ← | 60 | PBT | ← | ← | 40 | 270 | Normal | 1.0 | 20 | 10 | 1 | 172.5 | 1.30 | 80 | 10 | C (white spots) |
| Comparative Example 18 | IA | 15 | ← | ← | 60 | PBT | ← | ← | 40 | 270 | Normal | 1.0 | 20 | 10 | 1 | 172.5 | 1.30 | ← | 30 | C (white spots) |
| Comparative Example 19 | IA | 15 | ← | ← | 60 | PBT | ← | ← | 40 | 270 | Normal | 1.0 | 20 | 10 | 1 | 172.5 | 1.30 | ← | 60 | C (white spots) |
| Working Example 15 | IA | 15 | ← | ← | 60 | PBT | ← | ← | 40 | 270 | Normal | 1.0 | 20 | 10 | 1 | 172.5 | 1.30 | ← | 120 | A |
| Working Example 16 | IA | 15 | ← | ← | 60 | PBT | ← | ← | 40 | 270 | Normal | 1.0 | 20 | 10 | 1 | 172.5 | 1.30 | ← | 300 | A |
| Working Example 17 | IA | 15 | ← | ← | 60 | PBT | ← | ← | 40 | 270 | Normal | 1.0 | 20 | 10 | 1 | 172.5 | 1.30 | ← | 600 | A |
| Comparative Example 20 | IA | 15 | ← | ← | 60 | PBT | ← | ← | 40 | 270 | Normal | 1.0 | 20 | 10 | 1 | 172.5 | 1.30 | 100 | 10 | C (white spots) |
| Comparative Example 21 | IA | 15 | ← | ← | 60 | PBT | ← | ← | 40 | 270 | Normal | 1.0 | 20 | 10 | 1 | 172.5 | 1.30 | ← | 30 | C (white spots) |
| Working Example 18 | IA | 15 | ← | ← | 60 | PBT | ← | ← | 40 | 270 | Normal | 1.0 | 20 | 10 | 1 | 172.5 | 1.30 | ← | 60 | A |
| Working Example 19 | IA | 15 | ← | ← | 60 | PBT | ← | ← | 40 | 270 | Normal | 1.0 | 20 | 10 | 1 | 172.5 | 1.30 | ← | 120 | A |

TABLE 3-continued

| | Polyester (I) PET Copolymerized Component | | | | | Polyester (II) PBT Component | | | | Kneading Conditions | | | | Film Properties | | | | | Heat Treatment Conditions | | Characteristics |
|---|---|---|---|---|---|---|---|---|---|---|---|---|---|---|---|---|---|---|---|---|---|
| | Component | Mol % | IV | Tm (°C) | Mixing Amount (wt %) | Component | IV | Tm (°C) | Mixing Amount (wt %) | Kneading Temperature (°C) | Degree of Kneading | Q/N | Residence Time (minute) | Film Thickness (um) | Recrystallization Peak Number of Peaks | Tc (°C) | H (nW) | | Temperature (°C) | Time (second) | Retort Blushing Can Lid |
| Working Example 20 | IA | 15 | ↑ | ↑ | 60 | PBT | ↑ | ↑ | 40 | 270 | Normal | 1.0 | 20 | 10 | 1 | 172.5 | 1.30 | | ↑ | 300 | A |
| Working Example 21 | IA | 15 | ↑ | ↑ | 60 | PBT | ↑ | ↑ | 40 | 270 | Normal | 1.0 | 20 | 10 | 1 | 172.5 | 1.30 | | ↑ | 600 | A |
| Comparative Example 22 | IA | 15 | ↑ | ↑ | 60 | PBT | ↑ | ↑ | 40 | 270 | Normal | 1.0 | 20 | 10 | 1 | 172.5 | 1.30 | | 120 | 10 | C (white spots) |
| Working Example 22 | IA | 15 | ↑ | ↑ | 60 | PBT | ↑ | ↑ | 40 | 270 | Normal | 1.0 | 20 | 10 | 1 | 172.5 | 1.30 | | ↑ | 30 | B (slight white spots) |
| Working Example 23 | IA | 15 | ↑ | ↑ | 60 | PBT | ↑ | ↑ | 40 | 270 | Normal | 1.0 | 20 | 10 | 1 | 172.5 | 1.30 | | ↑ | 60 | A |
| Working Example 24 | IA | 15 | ↑ | ↑ | 60 | PBT | ↑ | ↑ | 40 | 270 | Normal | 1.0 | 20 | 10 | 1 | 172.5 | 1.30 | | ↑ | 120 | A |
| Working Example 25 | IA | 15 | ↑ | ↑ | 60 | PBT | ↑ | ↑ | 40 | 270 | Normal | 1.0 | 20 | 10 | 1 | 172.5 | 1.30 | | ↑ | 300 | A |
| Working Example 26 | IA | 15 | ↑ | ↑ | 60 | PBT | ↑ | ↑ | 40 | 270 | Normal | 1.0 | 20 | 10 | 1 | 172.5 | 1.30 | | ↑ | 600 | A |
| Comparative Example 23 | IA | 15 | ↑ | ↑ | 60 | PBT | ↑ | ↑ | 40 | 270 | Normal | 1.0 | 20 | 10 | 1 | 172.5 | 1.30 | | 195 | 10 | C (white spots) |
| Working Example 27 | IA | 15 | ↑ | ↑ | 60 | PBT | ↑ | ↑ | 40 | 270 | Normal | 1.0 | 20 | 10 | 1 | 172.5 | 1.30 | | ↑ | 30 | A |
| Working Example 28 | IA | 15 | ↑ | ↑ | 60 | PBT | ↑ | ↑ | 40 | 270 | Normal | 1.0 | 20 | 10 | 1 | 172.5 | 1.30 | | ↑ | 60 | A |
| Working Example 29 | IA | 15 | ↑ | ↑ | 60 | PBT | ↑ | ↑ | 40 | 270 | Normal | 1.0 | 20 | 10 | 1 | 172.5 | 1.30 | | ↑ | 120 | A |
| Working Example 30 | IA | 15 | ↑ | ↑ | 60 | PBT | ↑ | ↑ | 40 | 270 | Normal | 1.0 | 20 | 10 | 1 | 172.5 | 1.30 | | ↑ | 300 | A |
| Working Example 31 | IA | 15 | ↑ | ↑ | 60 | PBT | ↑ | ↑ | 40 | 270 | Normal | 1.0 | 20 | 10 | 1 | 172.5 | 1.30 | | ↑ | 600 | A |
| Comparative Example 24 | IA | 15 | ↑ | ↑ | 60 | PBT | ↑ | ↑ | 40 | 270 | Normal | 1.0 | 20 | 10 | 1 | 172.5 | 1.30 | | 205 | 10 | C (white spots) |
| Working Example 32 | IA | 15 | ↑ | ↑ | 60 | PBT | ↑ | ↑ | 40 | 270 | Normal | 1.0 | 20 | 10 | 1 | 172.5 | 1.30 | | ↑ | 30 | A |
| Working Example 33 | IA | 15 | ↑ | ↑ | 60 | PBT | ↑ | ↑ | 40 | 270 | Normal | 1.0 | 20 | 10 | 1 | 172.5 | 1.30 | | ↑ | 60 | A |
| Working Example 34 | IA | 15 | ↑ | ↑ | 60 | PBT | ↑ | ↑ | 40 | 270 | Normal | 1.0 | 20 | 10 | 1 | 172.5 | 1.30 | | ↑ | 120 | A |

TABLE 3-continued

| | Polyester (I) | | | | | Polyester (II) | | | | Kneading Conditions | | | | Film Properties | | | | Heat Treatment Conditions | | Characteristics |
|---|---|---|---|---|---|---|---|---|---|---|---|---|---|---|---|---|---|---|---|---|
| | PET Copolymerized Component | | | | Mixing Amount (wt %) | PBT Component | | | Mixing Amount (wt %) | Kneading Temperature (° C.) | Degree of Kneading | Q/N | Residence Time (minute) | Film Thickness (um) | Recrystallization Peak | | | Temperature (° C.) | Time (second) | Retort Blushing Can Lid |
| | Component | Mol % | IV | Tm (° C.) | | Component | IV | Tm (° C.) | | | | | | | Number of Peaks | Tc (° C.) | H (nW) | | | |
| Working Example 35 | IA | 15 | ↑ | ↑ | 60 | PBT | ↑ | ↑ | 40 | 270 | Normal | 1.0 | 20 | 10 | 1 | 172.5 | 1.30 | ↑ | 300 | A |
| Working Example 36 | IA | 15 | ↑ | ↑ | 60 | PBT | ↑ | ↑ | 40 | 270 | Normal | 1.0 | 20 | 10 | 1 | 172.5 | 1.30 | ↑ | 600 | A |
| Comparative Example 25 | IA | 15 | ↑ | ↑ | 60 | PBT | ↑ | ↑ | 40 | 270 | Normal | 1.0 | 20 | 10 | 1 | 172.5 | 1.30 | 220 | 10 | C (white spots) |
| Working Example 37 | IA | 15 | ↑ | ↑ | 60 | PBT | ↑ | ↑ | 40 | 270 | Normal | 1.0 | 20 | 10 | 1 | 172.5 | 1.30 | ↑ | 30 | A |
| Working Example 38 | IA | 15 | ↑ | ↑ | 60 | PBT | ↑ | ↑ | 40 | 270 | Normal | 1.0 | 20 | 10 | 1 | 172.5 | 1.30 | ↑ | 60 | A |
| Working Example 39 | IA | 15 | ↑ | ↑ | 60 | PBT | ↑ | ↑ | 40 | 270 | Normal | 1.0 | 20 | 10 | 1 | 172.5 | 1.30 | ↑ | 120 | A |
| Working Example 40 | IA | 15 | ↑ | ↑ | 60 | PBT | ↑ | ↑ | 40 | 270 | Normal | 1.0 | 20 | 10 | 1 | 172.5 | 1.30 | ↑ | 300 | A |
| Working Example 41 | IA | 15 | ↑ | ↑ | 60 | PBT | ↑ | ↑ | 40 | 270 | Normal | 1.0 | 20 | 10 | 1 | 172.5 | 1.30 | ↑ | 600 | A |

INDUSTRIAL APPLICABILITY

The organic-resin-coated metal sheet of the present invention and the metal can and the can lid that are made by processing the organic-resin-coated metal sheet are obtained by stacking, on at least a single surface of a metal sheet, an unstretched film that is the polyester-based resin composition obtained by blending the copolymerized polyester (I) composed mainly of a polyethylene terephthalate-based resin with the crystalline polyester (II) composed mainly of a polybutylene terephthalate-based resin and in which the mixing amount of the crystalline polyester (II) is 20 to 45 wt % in the resin composition. Therefore, retort blushing (white spots) at the time of retort sterilization treatment can be prevented corresponding to diversified contents and can manufacturing method and the industrial applicability is extremely high.

REFERENCE SIGNS LIST

1 Recrystallization peak
2 Peak top (apex)
3 Baseline
H Height from baseline to peak top

What is claimed is:

1. An organic-resin-coated metal sheet in which an unstretched film is stacked on at least a single surface of a metal sheet, the organic-resin-coated metal sheet being characterized in that
    the unstretched film is composed of a polyester-based resin composition obtained by blending copolymerized polyester (I) composed mainly of a polyethylene terephthalate-based resin with crystalline polyester (II) composed mainly of a polybutylene terephthalate-based resin with a mixing amount of the crystalline polyester (II) of 20 to 45 wt %,
    wherein a height H of a recrystallization peak in a temperature decrease in differential scanning calorimetry (DSC) of the unstretched film stacked on at least the single surface of the metal sheet is in a range of 0.8 mW≤H<2.0 mW.

2. The organic-resin-coated metal sheet according to claim 1, characterized in that
    the crystalline polyester (II) composed mainly of the polybutylene terephthalate-based resin is homopolyester.

3. The organic-resin-coated metal sheet according to claim 2, characterized in that
    a recrystallization peak in a temperature decrease in differential scanning calorimetry (DSC) of the unstretched film stacked on at least the single surface of the metal sheet has one peak.

4. The organic-resin-coated metal sheet according to claim 2, characterized in that
    the unstretched film composed of the polyester-based resin composition is a film formed by an extrusion coating method in which the unstretched film is extruded into a film shape through a die head of an extruder and is pressure-bonded and thermally bonded to the metal sheet by a laminating roll.

5. The organic-resin-coated metal sheet according to claim 2, characterized in that
    a thickness of the unstretched film composed of the polyester-based resin composition is 5 to 15 μm.

6. The organic-resin-coated metal sheet according to claim 1, characterized in that
    a recrystallization peak in a temperature decrease in differential scanning calorimetry (DSC) of the unstretched film stacked on at least the single surface of the metal sheet has one peak.

7. The organic-resin-coated metal sheet according to claim 6, characterized in that
    the unstretched film composed of the polyester-based resin composition is a film formed by an extrusion coating method in which the unstretched film is extruded into a film shape through a die head of an extruder and is pressure-bonded and thermally bonded to the metal sheet by a laminating roll.

8. The organic-resin-coated metal sheet according to claim 6, characterized in that
    a thickness of the unstretched film composed of the polyester-based resin composition is 5 to 15 μm.

9. The organic-resin-coated metal sheet according to claim 1, characterized in that
    the unstretched film composed of the polyester-based resin composition is a film formed by an extrusion coating method in which the unstretched film is extruded into a film shape through a die head of an extruder and is pressure-bonded and thermally bonded to the metal sheet by a laminating roll.

10. The organic-resin-coated metal sheet according to claim 1, characterized in that
    a thickness of the unstretched film composed of the polyester-based resin composition is 5 to 15 μm.

11. A metal can characterized by being made by processing the organic-resin-coated metal sheet according to claim 1.

12. A can lid characterized by being made by processing the organic-resin-coated metal sheet according to claim 1.

* * * * *